United States Patent [19]
Petrick

[11] Patent Number: 6,148,391
[45] Date of Patent: Nov. 14, 2000

[54] SYSTEM FOR SIMULTANEOUSLY ACCESSING ONE OR MORE STACK ELEMENTS BY MULTIPLE FUNCTIONAL UNITS USING REAL STACK ADDRESSES

[75] Inventor: Bruce Petrick, Sunnyvale, Calif.

[73] Assignee: Sun Microsystems, Inc., Palo Alto, Calif.

[21] Appl. No.: 09/049,163

[22] Filed: Mar. 26, 1998

[51] Int. Cl.⁷ ................................................ G06F 15/00
[52] U.S. Cl. .......................... 712/202; 712/23; 712/200; 712/215; 712/216; 712/217; 712/228; 711/109; 711/200
[58] Field of Search ............................ 712/204, 210, 712/228, 229, 212, 23, 200, 202, 215, 216, 217; 711/109, 200

[56] References Cited

U.S. PATENT DOCUMENTS

| | | | |
|---|---|---|---|
| 3,737,871 | 6/1973 | Katzman | 711/200 |
| 4,807,115 | 2/1989 | Trong | 712/215 |
| 4,992,938 | 2/1991 | Cocke et al. | 712/217 |
| 5,659,703 | 8/1997 | Moore et al. | 711/109 |
| 5,673,408 | 9/1997 | Shebanow et al. | 712/216 |
| 5,687,336 | 11/1997 | Shen et al. | 712/202 |
| 5,881,305 | 3/1999 | Walker | 712/23 |
| 5,884,061 | 3/1999 | Hesson et al. | 712/217 |
| 5,944,812 | 8/1999 | Walker | 712/228 |

*Primary Examiner*—Meng-Ai T. An
*Assistant Examiner*—Nabil El-Hady
*Attorney, Agent, or Firm*—Gunnison, McKay & Hodgson, LLP

[57] ABSTRACT

Embodiments of the present invention provide a stack renaming method and apparatus for stack based processors. Using principles of the present invention, a stack can be accessed simultaneously by one or more functional units in a stack processor. The stack apparatus includes a stack renaming unit capable of renaming a logical stack address to a real stack address. Each logical stack address corresponds to a storage element in the stack renaming unit which stores a real stack address. A circular counter is used in the stack renaming unit to sequentially cycle through each of the logical stack addresses. The real stack addresses corresponding to each of the logical stack addresses can be stored out of order in the stack renaming unit. A stack control unit is coupled to the stack renaming unit and provides one or more control signals to the stack renaming unit and coordinates the operation of the stack renaming unit within the stack apparatus. A stack memory circuit coupled to the stack renaming unit receives the real stack address and generates a data value to be used in a functional unit. The real address is provided to a functional unit by a real address output port coupled to the stack renaming unit. As long as there are no data dependencies or structural dependences, a functional unit is able to operate on the data value associated with the real address while other functional units may be accessing and using other stack values.

11 Claims, 11 Drawing Sheets

SYSTEM FOR SIMULTANEOUSLY ACCESSING ONE OR MORE STACK ELEMENTS BY MULTIPLE FUNCTIONAL UNITS USING REAL STACK ADDRESSES

FIELD OF THE INVENTION

The present invention relates generally to computer architecture and, more specifically, to a stack renaming method and apparatus for stack based processors.

BACKGROUND OF THE INVENTION

An increasing number of devices used in business and home are controlled by small embedded processors. Generally, these embedded processors are low-cost and include a limited amount of memory or storage for executing applications. Consequently, the applications executed on these embedded processors must also be relatively small and compact.

It is also desirable that these small applications be interoperable with a large class of devices, such as cellular phones, manufactured by different companies. This reduces the cost associated with developing software applications and therefore decreases the overall cost of ownership for the device. For example, cellular phone users should be able to transfer applications to each other and download them into their phone for processing. This would greatly enhance the flexibility and feature set on cellular phones even though the phones may be different models designed by different manufacturers.

A general purpose stack based processor fits these requirements well because stack instructions tend to be small and compact. The general purpose stack based processor includes a stack for storing operands and a stack processor which processes instructions by popping one or more operands off the stack, operating on them, and then pushing the results back on the stack for another instruction to process. Stack based executables are compact because the stack instructions reference operands implicitly on the stack rather than explicitly in the instructions. The storage space saved by not referencing operands such as registers, memory addresses, or immediate values explicitly can be used to store additional stack instructions.

Embedding a general purpose stack based processor in a wide variety of devices is also very cost effective. Compared with RISC (reduced instruction set computer), CISC (complex instruction set computer) processors, or EPIC (Explicitly Parallel Instruction Computer) stack processor research and development costs are relatively low. Stack processors are well understood and relatively simple to design. As discussed above, another part of the cost effectiveness of stack processors is based on developing software that can be shared and used by a wide variety of different devices. By increasing software interoperability between devices, stack based processors can be produced in high volumes with low cost, and yet have high overall profits. For example, software applications consisting of architecturally neutral bytecode instructions can be readily shared when designed for execution on a Java Virtual Machine (JVM) stack based processor such as described in the book, "The Java Virtual Machine Specification" by Tim Lindholm and Frank Yellin, published by Addison-Wesley, 1997. These bytecode instruction based software applications are compact and substantially interoperable with almost any device utilizing, or simulating, a JVM stack based processor.

Unfortunately, typical stack based processors are generally not well suited for high-performance multimedia or other real time processing. This is because stack based processors spend too many machine cycles accessing operands on the stack to perform real-time processing. Further, a stack based processor having multiple functional units can not use them to process information in parallel because the stack must be accessed sequentially. Specifically, only one instruction at a time can pop operands off the top of stack or push results back on to the top of stack. In some cases, instructions are waiting for the stack even though they are not dependent on the results produced by another instruction in the instruction stream. These delays reduce the level of performance a stack based processor with multiple functional units is capable of providing.

What is needed is a method and apparatus for multiple functional units to access the stack of a stack based processor simultaneously and process information in parallel.

SUMMARY OF THE INVENTION

Embodiments of the present invention provide a stack renaming method and apparatus for stack based processors. Using principles of the present invention, a stack can be accessed simultaneously by one or more functional units in a stack processor. Each functional unit in the stack based processor is coupled to the stack apparatus via a one or more ports. Functional units can access the stack substantially simultaneously because they access the stack using real stack addresses rather than accessing the stack sequentially using the top of stack indicator. This allows processing to continue on the stack even though one or more functional units may not be completely finished pushing or popping data off the stack. This aspect of the present invention can provide significant performance improvements for stack based processors.

In one embodiment, a stack apparatus is capable of providing access to a stack where at least one stack element on the stack is accessible substantially simultaneously by one or more functional units in a stack processor. The stack apparatus includes a stack renaming unit capable of renaming a logical stack address to a real stack address. Each logical stack address corresponds to a storage element in the stack renaming unit which stores a real stack address. A circular counter is used in the stack renaming unit to sequentially cycle through each of the logical stack addresses. The real stack addresses corresponding to each of the logical stack addresses can be stored out of order in the stack renaming unit. In one embodiment, a stack control unit is coupled to the stack renaming unit and provides one or more control signals to the stack renaming unit and coordinates the operation of the stack renaming unit within the stack apparatus. A stack memory circuit coupled to the stack renaming unit receives the real stack address and generates a data value to be used in a functional unit. The real address is provided to a functional unit by a real address output port coupled to the stack renaming unit. The functional unit is able to operate on the data value associated with the real address while other functional units may be accessing and using other stack values.

In another embodiment, the stack renaming unit in the stack apparatus also includes a stack rename logic capable of mapping a series of logical stack address to a series of real stack address which can be out of order. Essentially, a stack renaming unit has a number of storage elements capable of storing a corresponding number of the real stack addresses used in a stack memory circuit. Each real stack address in the stack memory circuit can be addressed using the logical stack addresses. A circular counter element coupled to the stack rename unit sequences circularly through each logical stack address to access each of the real stack addresses stored in the stack rename unit. A reclamation queue is coupled to the stack renaming unit and provides real stack addresses to the stack memory circuit. These real stack addresses stored in the reclamation queue were previously being used by a functional unit. After the calculation is complete, the real stack address eventually finds its way back into one of the storage elements in the stack renaming unit. The reclamation queue is a holding area for real stack addresses which are no longer being used by the one or more functional units.

A third embodiment of the present invention also includes a stack annex operatively coupled to the stack memory circuit and operatively coupled to the stack renaming unit which operates as a temporary pipeline register capable of holding one or more data values generated by the one or more functional units.

An alternative embodiment of the present invention includes methods for pushing and popping data off of a stack using software.

In one embodiment, these methods are implemented on a computer system for pushing a data value onto a stack storage element of a stack memory circuit. The methods, when used in conjunction with the circuitry discussed above, enables the stack memory circuit to provide substantially simultaneous access to more than one stack element by one or more functional units in a stack processor. First, a first logical stack address generated by a top of stack indicator is mapped to a first real stack address. This first real stack address is provided by the stack memory circuit to a first functional unit. Even though the first functional unit may be busy trying to generate a result, the computer will advance the top of stack indicator to a second logical address before the, first functional unit has generated results. The first real stack address is used to store the results generated by the first functional unit directly into the corresponding stack storage element in the stack memory circuit. In a similar manner the second logical address generated by the top of stack indicator is renamed to the second real stack address to avoid further conflict which may arise.

The stack renaming circuit is advantageous because it allows the stack to be used when the top of stack is in use by another instruction or functional unit. A renaming unit adds another degree of freedom to the operation of the stack which removes the requirement that each storage element in the stack be accessed in sequence. Essentially, the renaming unit allows another instruction to use the top of stack even though the results from a previous instruction executing on a functional unit are not complete.

BRIEF DESCRIPTION OF THE DRAWINGS

These and other features and advantages of the present invention will be apparent from the Detailed Description and the corresponding Figures. Identical or similar features are designated by the same reference numeral(s) throughout the drawings and the Detailed Description.

DETAILED DESCRIPTION

Figure 1:
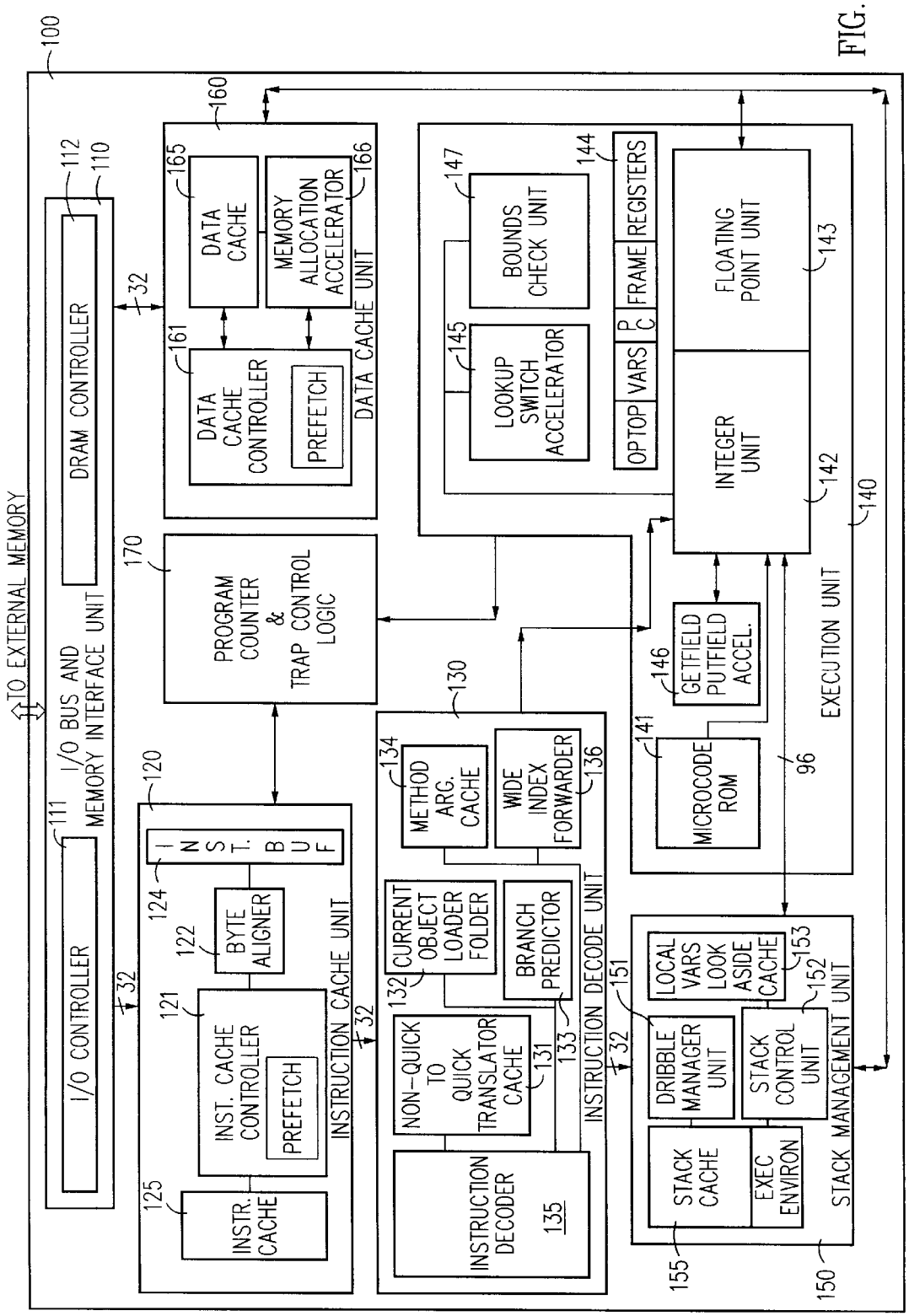
FIG. 1 is a block diagram of one embodiment of virtual machine hardware processor of the present invention.

FIG. 1 illustrates one embodiment of a virtual machine instruction hardware processor 100, hereinafter hardware processor 100, in accordance with the present invention, that directly executes virtual machine instructions that are processor architecture independent. The performance of hardware processor 100 in executing JAVA virtual machine instructions is more beneficial than high-end CPUs, such as the Intel PENTIUM microprocessor, Intel Merced procecessor or the Sun Microsystems ULTRASPARC processor, (ULTRASPARC is a trademark of Sun Microsystems of Palo Alto, Calif., PENTIUM and Merced are a trademark of Intel Corp. of Sunnyvale, Calif.) interpreting the same virtual machine instructions with a software JAVA interpreter or with a JAVA just-in-time compiler. Further, hardware processor 100 is low cost and exhibits low power consumption. As a result, hardware processor 100 is well suited for portable applications. Hardware processor 100 provides similar advantages for other virtual machine stack-based architectures as well as for virtual machines utilizing features such as garbage collection, and thread synchronization. In view of these characteristics, a system based on hardware processor 100 presents attractive price for performance characteristics as compared with alternative virtual machine execution environments including software interpreters and just-in-time compilers. Nonetheless, the present invention is not limited to virtual machine hardware processor embodiments, and encompasses any suitable stack-based, or non-stack-based machine implementations, including implementations emulating the JAVA virtual machine as a software interpreter, compiling JAVA virtual machine instructions (either in batch or just-in-time) to machine instructions native to a particular hardware processor, or providing hardware implementing the JAVA virtual machine in microcode, directly in silicon, or in some combination thereof.

Regarding price for performance characteristics, hardware processor 100 has the advantage that the 250 Kilobytes to 500 Kilobytes (Kbytes) of memory storage, e.g., read-only memory or random access memory, typically required by a software interpreter, is eliminated. A simulation of hardware processor 100 has shown that hardware processor 100 executes virtual machine instructions twenty times faster than a software interpreter running on a variety of applications on a PENTIUM processor clocked at the same clock rate as hardware processor 100, and executing the same virtual machine instructions. Another simulation of hardware processor 100 showed that hardware processor 100 executes virtual machine instructions five times faster than a just-in-time compiler running on a PENTIUM processor running at the same clock rate as hardware processor 100, and executing the same virtual machine instructions.

In environments in which the expense of the memory required for a software virtual machine instruction interpreter is prohibitive, hardware processor 100 is advantageous. These applications include, for example, an Internet chip for network appliances, a cellular telephone processor, other telecommunications integrated circuits, or other low-power, low-cost applications such as embedded processors, and portable devices.

As used herein, a virtual machine is an abstract computing machine that, like a real computing machine, has an instruction set and uses various memory areas. A virtual machine specification defines a set of processor architecture independent virtual machine instructions that are executed by a virtual machine implementation, e.g., hardware processor 100. Each virtual machine instruction defines a specific operation that is to be performed. The virtual computing machine need not understand the computer language that is used to generate virtual machine instructions or the underlying implementation of the virtual machine. Only a particular file format for virtual machine instructions needs to be understood.

In an exemplary embodiment, the virtual machine instructions are JAVA virtual machine instructions. Each JAVA virtual machine instruction includes one or more bytes that encode instruction identifying information, operands, and any other required information. However, the particular set of virtual machine instructions utilized is not an essential aspect of this invention. In view of this disclosure, those skilled in the art can modify the invention for a particular set of virtual machine instructions, or for changes to the JAVA virtual machine specification.

Figure 2:
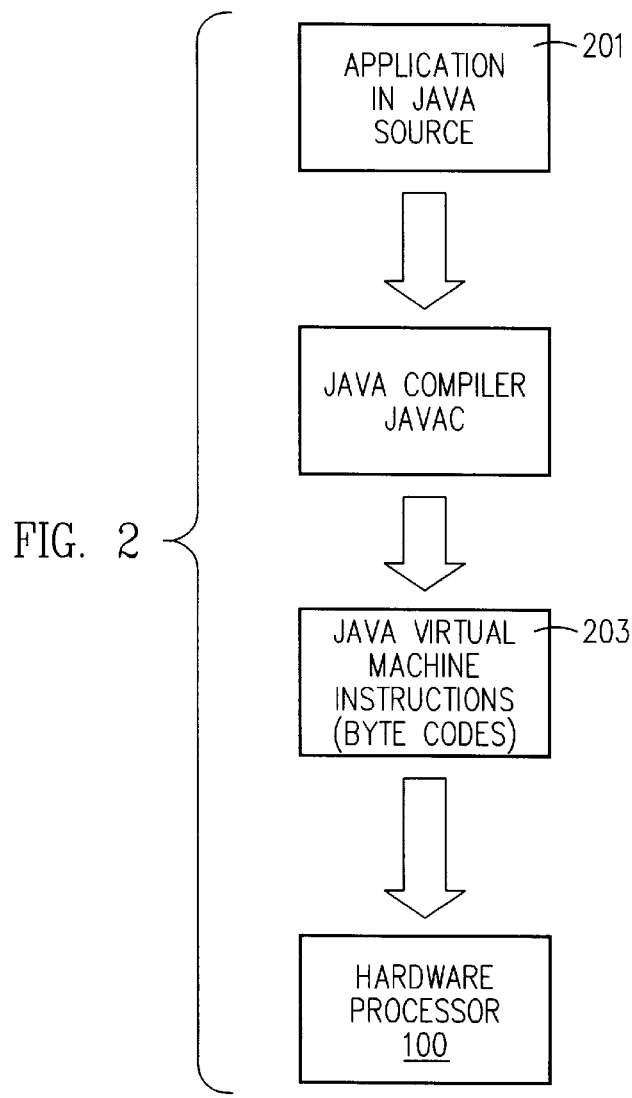
FIG. 2 is flow diagram for generating a virtual machine instruction used in one embodiment of the invention.

A JAVA compiler JAVAC, (FIG. 2) that is executing on a computer platform, converts an application 201 written in the JAVA computer language to an architecture neutral object file format encoding a compiled instruction sequence 203, according to the JAVA Virtual Machine Specification, that includes a compiled instruction set. However, for this invention, only a source of virtual machine instructions and related information is needed. The method or technique used to generate the source of virtual machine instructions and related information is not essential to this invention.

Compiled instruction sequence 203 is executable on hardware processor 100 as well as on any computer platform that implements the JAVA virtual machine using, for example, a software interpreter or just-in-time (JIT) compiler. However, as described above, hardware processor 100 provides significant performance advantages over the software implementations.

In this embodiment, hardware processor 100 (FIG. 1) processes the JAVA virtual machine instructions, which include bytecodes. Hardware processor 100, as explained more completely below, directly executes most of the bytecodes. However, execution of some of the bytecodes is implemented via microcode.

One strategy for selecting virtual machine instructions that are executed directly by hardware processor 100 is described by way of an example. Thirty percent of the JAVA virtual machine instructions are pure hardware translations; instructions implemented in this manner include constant loading and simple stack operations. The next 50% of the virtual machine instructions are implemented mostly, but not entirely, in hardware and require some firmware assistance; these include stack based operations and array instructions. The next 10% of the JAVA virtual machine instructions are implemented in hardware, but require significant firmware support as well; these include function invocation and function return. The remaining 10% of the JAVA virtual machine instructions are not supported in hardware, but rather are supported by a firmware trap and/or microcode; these include functions such as exception handlers. Herein, firmware means microcode stored in ROM that when executed controls the operations of hardware processor 100.

Returning to FIG. 1, in one embodiment, hardware processor 100 includes an I/O bus and memory interface unit 110, an instruction cache unit 120 including instruction cache 125, an instruction decode unit 130, a unified execution unit 140, a stack management unit 150 including stack cache 155, a data cache unit 160 including a data cache 165, and program counter and trap control logic unit 170. Each of these units is described more completely below.

Also, as illustrated in FIG. 1, each unit includes several elements. For clarity and to avoid distracting from the invention, the interconnections between elements within a unit are not shown in FIG. 1. However, in view of the following description, those of skill in the art will understand the interconnections and cooperation between the elements in a unit and between the various units. For a more detailed discussion of unit 100, see U.S. patent application Ser. No. 08/788,807, filed Jan. 23, 1997, entitled "IMPLEMENTATION OF A JAVA VIRTUAL MACHINE IN HARDWARE" naming as inventors Marc Tremblay and James Michael O'Connor, assigned to the assignee of this application, which is incorporated herein by reference in its entirety, and which issued as U.S. Pat. No. 6,021,469 on Feb. 1, 2000.

Figure 3:
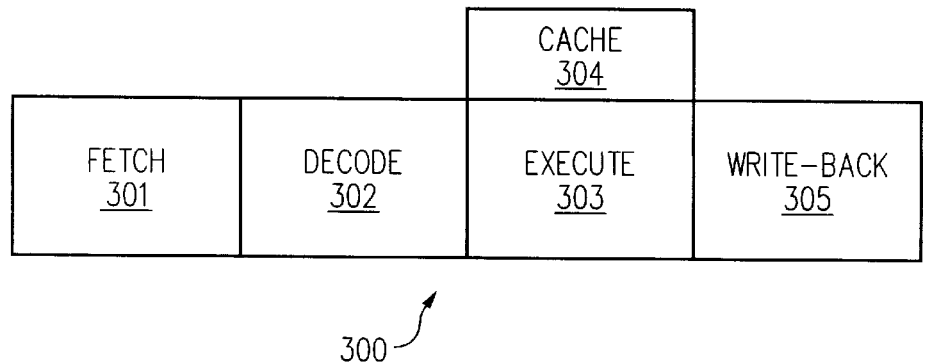
FIG. 3 illustrates an instruction pipeline implemented in the hardware processor of FIG. 1.

The pipeline stages implemented using the units illustrated in FIG. 1 include fetch, decode, execute, and write-back stages. If desired, extra stages for memory access or exception resolution are provided in hardware processor 100. FIG. 3 is an illustration of a four stage pipeline for execution of instructions in the exemplary embodiment of processor 100. In fetch stage 301, a virtual machine instruction is fetched and placed in instruction buffer 124 (FIG. 1). The virtual machine instruction is fetched from one of (i) a fixed size cache line from instruction cache 125 or (ii) external memory.

With regard to fetching, aside from instructions tableswitch and lookupswitch, each virtual machine instruction is between one and five bytes long. Thus, to keep things simple, at least forty bits are required to guarantee that all of a given instruction is contained in the fetch.

Another alternative is to always fetch a predetermined number of bytes, for example, four bytes, starting with the opcode. This is sufficient for 95% of JAVA virtual machine instructions. For an instruction requiring more than three bytes of operands, another cycle in the front end must be tolerated. In this case, the instruction execution can be started with the first operands fetched even if the full set of operands are not yet available.

In decode stage 302 (FIG. 3), the virtual machine instruction at the front of instruction buffer 124 (FIG. 1) is decoded and instruction folding is performed if possible. Stack cache 155 is accessed only if needed by the virtual machine instruction. Register OPTOP, that contains a pointer OPTOP to a top of a stack 400 (FIG. 4A), is also updated in decode stage 302 (FIG. 3). Herein, for convenience, the value in a register and the register are assigned the same reference numeral. Further, in the following discussion, use of a register to store a pointer is illustrative only of one embodiment. Depending on the specific implementation of the invention, the pointer may be implemented using a hardware register, a hardware counter, a software counter, a software pointer, or other equivalent embodiments known to those skilled in the art. The particular implementation selected is not essential to the invention, and typically is made based on a price to performance trade-off.

In execute stage 303, the virtual machine instruction is executed for one or more cycles. Typically, in execute stage 303, an ALU (not shown) in integer unit 142 (FIG. 1) is used either to do an arithmetic computation or to calculate the address of a load or store from data cache unit (DCU) 160. If necessary, traps are prioritized and taken at the end of execute stage 303 (FIG. 3). For control flow instructions, the branch address is calculated in execute stage 303, as well as the condition upon which the branch is dependent.

Cache stage 304 is a non-pipelined stage. Data cache 165 (FIG. 1) is accessed if needed during execution stage 303 (FIG. 3). The reason that stage 304 is non-pipelined is because hardware processor 100 is a stack-based machine. Thus, the instruction following a load is almost always dependent on the value returned by the load. Consequently, in this embodiment, the pipeline is held for one cycle for a data cache access. This reduces the pipeline stages, and the die area used by the pipeline for the extra registers and bypasses.

Write-back stage 305 is the last stage in the pipeline. In stage 305, the calculated data is written back to stack cache 155. Hardware processor 100, in this embodiment, directly implements a stack 400 (FIG. 4A) that supports the JAVA virtual machine stack-based architecture (See Appendix I). Sixty-four entries on stack 400 are contained on stack cache 155 in stack management unit 150. Some entries in stack 400 may be duplicated on stack cache 150. Operations on data are performed through stack cache 155.

Stack 400 of hardware processor 100 is primarily used as a repository of information for methods. At any point in time, hardware processor 100 is executing a single method. Each method has memory space, i.e., a method frame on stack 400, allocated for a set of local variables, an operand stack, and an execution environment structure.

A new method frame, e.g., method frame 2-410, is allocated by hardware processor 100 upon a method invocation in execution stage 303 (FIG. 3) and becomes the current frame, i.e., the frame of the current method. Current frame 410 (FIG. 4A), as well as the other method frames, may contain a part of or all of the following six entities, depending on various method invoking situations:

Object reference;

Incoming arguments;

Local variables;

Invoker's method context;

Operand stack; and

Return value from method.

Figure 4A:
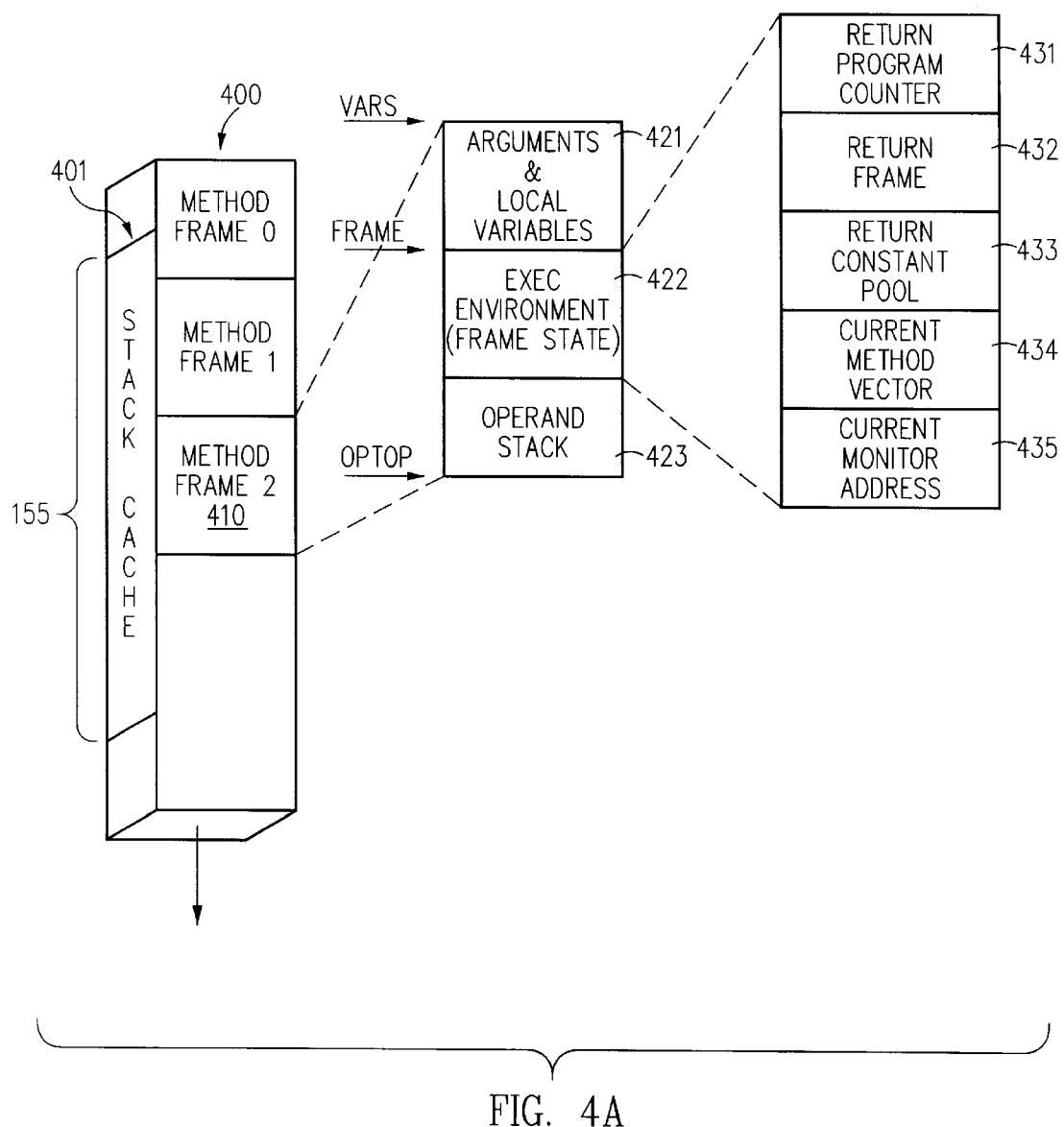
FIG. 4A is an illustration of the one embodiment of the logical organization of a stack structure where each method frame includes a local variable storage area, an environment storage area, and an operand stack utilized by the hardware processor of FIG. 1.

In FIG. 4A, object reference, incoming arguments, and local variables are included in arguments and local variables area 421. The invoker's method context is included in execution environment 422, sometimes called frame state, that in turn includes: a return program counter value 431 that is the address of the virtual machine instruction, e.g., JAVA opcode, next to the method invoke instruction; a return frame 432 that is the location of the calling method's frame; a return constant pool pointer 433 that is a pointer to the calling method's constant pool table; a current method vector 434 that is the base address of the current method's vector table; and a current monitor address 435 that is the address of the current method's monitor.

The object reference is an indirect pointer to an object-storage representing the object being targeted for the method invocation. JAVA compiler JAVAC (See FIG. 2.) generates an instruction to push this pointer onto operand stack 423 (FIG. 4A) prior to generating an invoke instruction. This object reference is accessible as local variable zero during the execution of the method. This indirect pointer is not available for a static method invocation as there is no target-object defined for a static method invocation.

The list of incoming arguments transfers information from the calling method to the invoked method. Like the object reference, the incoming arguments are pushed onto stack 400 by JAVA compiler generated instructions and may be accessed as local variables. JAVA compiler JAVAC (See FIG. 2.) statically generates a list of arguments for current method 410 (FIG. 4A), and hardware processor 100 determines the number of arguments from the list. When the object reference is present in the frame for a non-static method invocation, the first argument is accessible as local variable one. For a static method invocation, the first argument becomes local variable zero.

For 64-bit arguments, as well as 64-bit entities in general, the upper 32-bits, i.e., the 32 most significant bits, of a 64-bit entity are placed on the upper location of stack 400, i.e., pushed on the stack last. For example, when a 64-bit entity is on the top of stack 400, the upper 32-bit portion of the 64-bit entity is on the top of the stack, and the lower 32-bit portion of the 64-bit entity is in the storage location immediately adjacent to the top of stack 400.

The local variable area on stack 400 (FIG. 4A) for current method 410 represents temporary variable storage space which is allocated and remains effective during invocation of method 410. JAVA compiler JAVAC (FIG. 2) statically determines the required number of local variables and hardware processor 100 allocates temporary variable storage space accordingly.

When a method is executing on hardware processor 100, the local variables typically reside in stack cache 155 and are addressed as offsets from pointer VARS (FIGS. 1 and 4A), which points to the position of the local variable zero. Instructions are provided to load the values of local variables onto operand stack 423 and store values from operand stack into local variables area 421.

The information in execution environment 422 includes the invoker's method context. When a new frame is built for the current method, hardware processor 100 pushes the invoker's method context onto newly allocated frame 410, and later utilizes the information to restore the invoker's method context before returning. Pointer FRAME (FIGS. 1 and 4A) is a pointer to the execution environment of the current method. In the exemplary embodiment, each register in register set 144 (FIG. 1) is 32-bits wide.

Operand stack 423 is allocated to support the execution of the virtual machine instructions within the current method. Program counter register PC (FIG. 1) contains the address of the next instruction, e.g., opcode, to be executed. Locations on operand stack 423 (FIG. 4A) are used to store the operands of virtual machine instructions, providing both source and target storage locations for instruction execution. The size of operand stack 423 is statically determined by JAVA compiler JAVAC (FIG. 2) and hardware processor 100 allocates space for operand stack 423 accordingly.

Register OPTOP (FIGS. 1 and 4A) holds a pointer to a top of operand stack 423. The invoked method may return its execution result onto the invoker's top of stack, so that the invoker can access the return value with operand stack references. The return value is placed on the area where an object reference or an argument is pushed before a method invocation.

Simulation results on the JAVA virtual machine indicate that method invocation consumes a significant portion of the execution time (20–40%). Given this attractive target for accelerating execution of virtual machine instructions, hardware support for method invocation is included in hardware processor 100, as described more completely below.

The beginning of the stack frame of a newly invoked method, i.e., the object reference and the arguments passed by the caller, are already stored on stack 400 since the object reference and the incoming arguments come from the top of the stack of the caller. As explained above, following these items on stack 400, the local variables are loaded and then the execution environment is loaded.

One way to speed up this process is for hardware processor 100 to load the execution environment in the background and indicate what has been loaded so far, e.g., simple one bit scoreboarding. Hardware processor 100 tries to execute the bytecodes of the called method as soon as possible, even though stack 400 is not completely loaded. If accesses are made to variables already loaded, overlapping of execution with loading of stack 400 is achieved, otherwise a hardware interlock occurs and hardware processor 100 just waits for the variable or variables in the execution environment to be loaded.

Figure 4B:
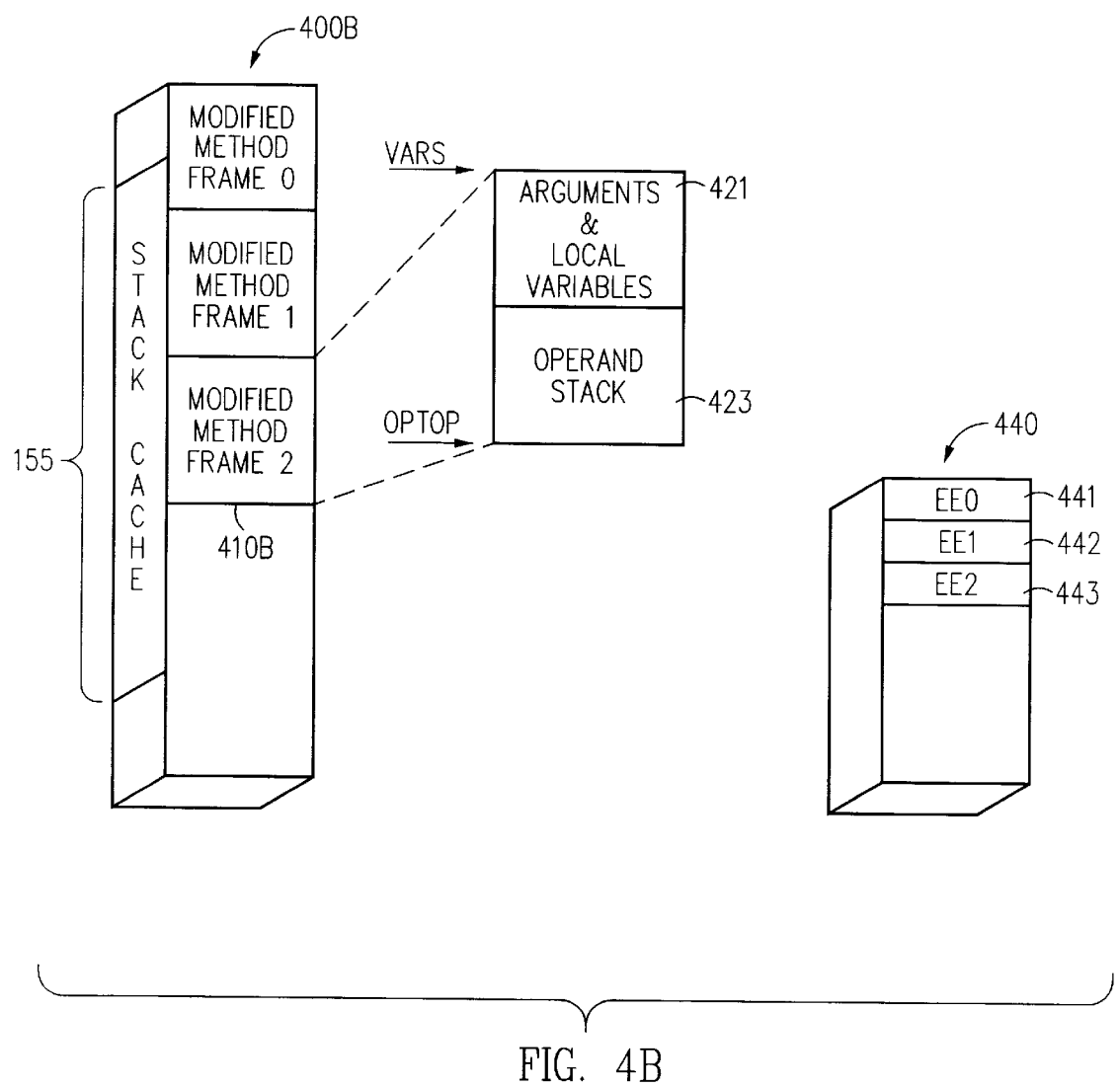
FIG. 4B is an illustration of an alternative embodiment for logically organizing the stack structure into two portions: a first portion of the method frame in the stack includes a local variable storage area and an operand stack and a second portion includes an environment storage area for the method frame in a separate environment stack.

FIG. 4B illustrates another way to accelerate method invocation. Instead of storing the entire method frame in stack 400, the execution environment of each method frame is stored separately from the local variable area and the operand stack of the method frame. Thus, in this embodiment, stack 400B contains modified method frames, e.g. modified method frame 410B having only local variable area 421 and operand stack 423. Execution environment 422 (FIG. 4A) of the method frame is stored in an execution environment memory 440. Storing the execution environment in execution environment memory 440 reduces the amount of data in stack cache 155. Therefore, the size of stack cache 155 can be reduced. Furthermore, execution environment memory 440 and stack cache 155 can be accessed simultaneously. Thus, method invocation can be accelerated by loading or storing the execution environment in parallel with loading or storing data onto stack 400B.

In one embodiment of stack management unit 150, the memory architecture of execution environment memory 440 is also a stack. As modified method frames are pushed onto stack 400B through stack cache 155, corresponding execution environments are pushed onto execution environment memory 440. For example, since modified method frames 0 to 2, as shown in FIG. 4B are in stack 400B, execution environments (EE) 0 to 2, respectively, are stored in execution environment memory circuit 440.

To further enhance method invocation, an execution environment cache can be added to improve the speed of saving and retrieving the execution environment during method invocation. The architecture described more completely below for stack cache 155, dribbler manager unit 151, and stack control unit 152 for caching stack 400, can also be applied to caching execution environment memory 440.

Figure 4C:
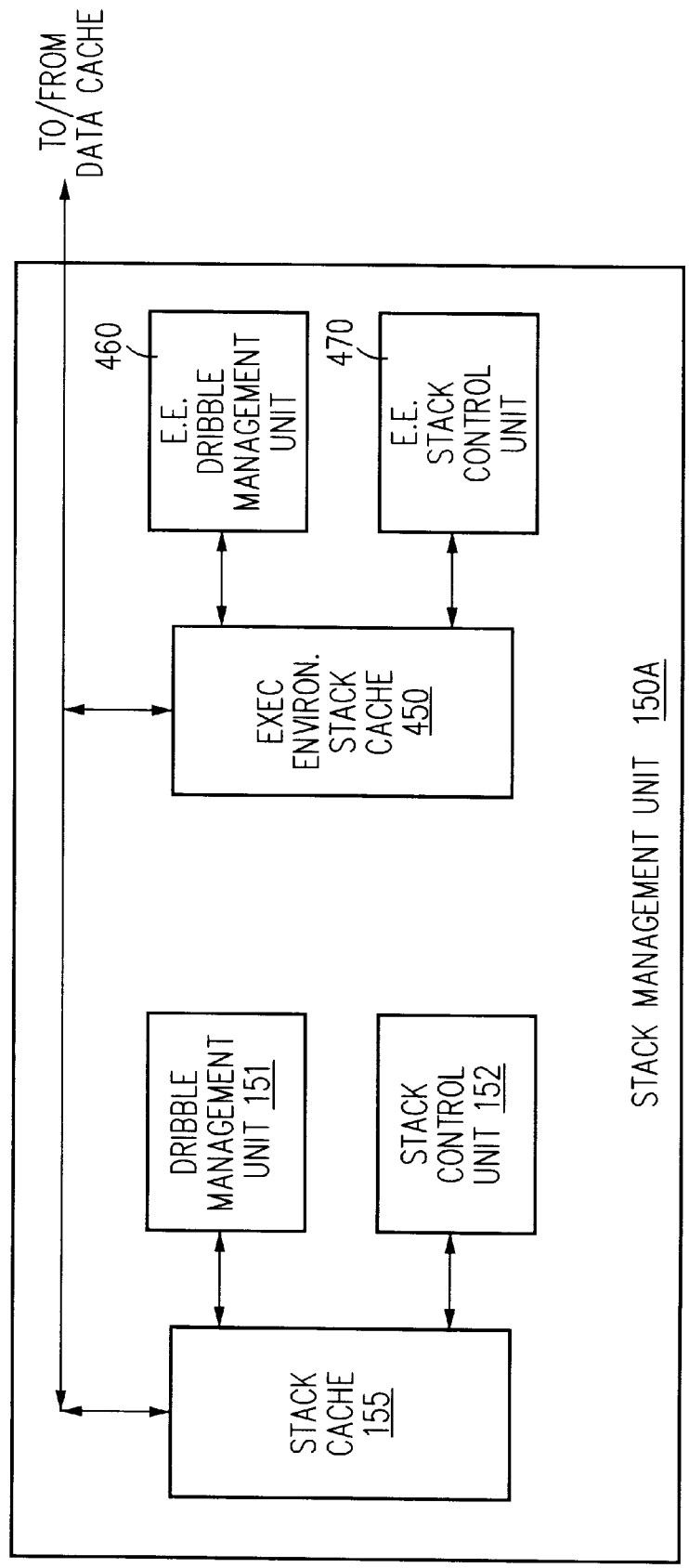
FIG. 4C is an illustration of an alternative embodiment of the stack management unit for the stack and execution environment stack of FIG. 4B.

FIG. 4C illustrates an embodiment of stack management unit 150A modified to support both stack 400B and execution environment memory 440. Specifically, the embodiment of stack management unit 150A in FIG. 4C adds an execution environment stack cache 450, an execution environment dribble manager unit 460, and an execution environment stack control unit 470. Typically, execution dribble manager unit 460 transfers an entire execution environment between execution environment cache, 450 and execution environment memory 440 during a spill operation or a fill operation.

I/O Bus and Memory Interface Unit

I/O bus and memory interface unit 110 (FIG. 1), sometimes called interface unit 110, implements an interface between hardware processor 100 and a memory hierarchy which, in an exemplary embodiment, includes external memory and may optionally include memory storage and/or interfaces on the same die as hardware processor 100. In this embodiment, an I/O controller 111 interfaces with an external I/O device and memory controller 112 which interfaces with external memory. Herein, external memory means memory external to hardware processor 100. However, external memory either may be included on the same die as hardware processor 100, may be external to the die containing hardware processor 100, or may include both on and off-die portions.

In another embodiment, requests to I/O devices go through memory controller 112 which maintains an address map of the entire system including hardware processor 100. On the memory bus of this embodiment, hardware processor 100 is the only master and does not have to arbitrate to use the memory bus. Hence, alternatives for the input/output bus that interfaces with I/O bus and memory interface unit 110 include supporting memory-mapped schemes, providing direct support for PCI, PCMCIA, or other standard busses. Fast graphics (w/ VIS or other technology) may optionally be included on the die with hardware processor 100.

I/O bus and memory interface unit 110 generates read and write requests to external memory. Specifically, interface unit 110 provides an interface for instruction cache and data cache controllers 121 and 161 to the external memory. Interface unit 110 includes arbitration logic for internal requests from instruction cache controller 121 and data cache controller 161 to access external memory and, in response to a request, initiates either a read or a write request on the memory bus to the external memory. A request from data cache controller 121 is always treated as higher priority relative to a request from instruction cache controller 161.

Interface unit 110 provides an acknowledgment signal to the requesting instruction cache controller 121, or data cache controller 161 on read cycles so that the requesting controller can latch the data. On write cycles, the acknowledgment signal from interface unit 110 is used for flow control so that the requesting instruction cache controller 121 or data cache controller 161 does not generate a new request when there is one pending. Interface unit 110 also handles errors generated on the memory bus to the external memory.

Instruction Cache Unit

Instruction cache unit (ICU) 120 (FIG. 1) fetches virtual machine instructions from instruction cache 125 and provides the instructions to instruction decode unit 130. In this embodiment, upon a instruction cache hit, instruction cache controller 121, in one cycle, transfers an instruction from instruction cache 125 to instruction buffer 124 where the instruction is held until integer execution unit IEU, that is described more completely below, is ready to process the instruction. This separates the rest of pipeline 300 (FIG. 3) in hardware processor 100 from fetch stage 301. If it is undesirable to incur the complexity of supporting an instruction-buffer type of arrangement, a temporary one instruction register is sufficient for most purposes. However, instruction fetching, caching, and buffering should provide sufficient instruction bandwidth to support instruction folding as described below.

The front end of hardware processor 100 is largely separate from the rest of hardware processor 100. Ideally, one instruction per cycle is delivered to the execution pipeline. The instructions are aligned on an arbitrary eight-bit boundary by byte aligner circuit 122 in response to a signal from instruction decode unit 130. Thus, the front end of hardware processor 100 efficiently deals with fetching from any byte position. Also, hardware processor 100 deals with the problems of instructions that span multiple cache lines of cache 125. In this case, since the opcode is the first byte, the design is able to tolerate an extra cycle of fetch latency for the operands. Thus, a very simple de-coupling between the fetching and execution of the bytecodes is possible.

In case of an instruction cache miss, instruction cache controller 121 generates an external memory request for the missed instruction to IO bus and memory interface unit 110. If instruction buffer 124 is empty, or nearly empty, when there is an instruction cache miss, instruction decode unit 130 is stalled, i.e., pipeline 300 is stalled. Specifically, instruction cache controller 121 generates a stall signal upon a cache miss which is used along with an instruction buffer empty signal to determine whether to stall pipeline 300. Instruction cache 125 can be invalidated to accommodate self-modifying code, e.g., instruction cache controller 121 can invalidate a particular line in instruction cache 125.

Thus, instruction cache controller 121 determines the next instruction to be fetched, i.e., which instruction in instruction cache 125 needs to accessed, and generates address, data and control signals for data and tag RAMs in instruction cache 125. On a cache hit, four bytes of data are fetched from instruction cache 125 in a single cycle, and a maximum of four bytes can be written into instruction buffer 124.

Byte aligner circuit 122 aligns the data out of the instruction cache RAM and feeds the aligned data to instruction buffer 124. As explained more completely below, the first two bytes in instruction buffer 124 are decoded to determine the length of the virtual machine instruction. Instruction buffer 124 tracks the valid instructions in the queue and updates the entries, as explained more completely below.

Instruction cache controller 121 also provides the data path and control for handling instruction cache misses. On an instruction cache miss, instruction cache controller 121 generates a cache fill request to I/O bus and memory interface unit 110. On receiving data from external memory, instruction cache controller 121 writes the data into instruction cache 125 and the data are also bypassed into instruction buffer 124. Data are bypassed to instruction buffer 124 as soon as the data are available from external memory, and before the completion of the cache fill.

Instruction cache controller 121 continues fetching sequential data until instruction buffer 124 is full or a branch or trap has taken place. In one embodiment, instruction buffer 124 is considered full if there are more than eight bytes of valid entries in buffer 124. Thus, typically, eight bytes of data are written into instruction cache 125 from external memory in response to the cache fill request sent to interface unit 110 by instruction cache unit 120. If there is a branch or trap taken while processing an instruction cache miss, only after the completion of the miss processing is the trap or branch executed.

When an error is generated during an instruction cache fill transaction, a fault indication is generated and stored into instruction buffer 124 along with the virtual machine instruction, i.e., a fault bit is set. The line is not written into instruction cache 125. Thus, the erroneous cache fill transaction acts like a non-cacheable transaction except that a fault bit is set. When the instruction is decoded, a trap is taken.

Instruction cache controller 121 also services non-cacheable instruction reads. An instruction cache enable (ICE) bit, in a processor status register in register set 144, is used to define whether a load can be cached. If the instruction cache enable bit is cleared, instruction cache unit 120 treats all loads as non-cacheable loads. Instruction cache controller 121 issues a non-cacheable request to interface unit 110 for non-cacheable instructions. When the data are available on a cache fill bus for the non-cacheable instruction, the data are bypassed into instruction buffer 124 and are not written into instruction cache 125.

In this embodiment, instruction cache 125 is a direct-mapped, eight-byte line size cache. Instruction cache 125 has a single cycle latency. The cache size is configurable to 0K, 1K, 2K, 4K, 8K and 16K byte sizes where K means kilo. The default size is 4K bytes. Each line has a cache tag entry associated with the line. Each cache tag contains a twenty bit address tag field and one valid bit for the default 4K byte size.

Instruction buffer 124, which, in an exemplary embodiment, is a twelve-byte deep first-in, first-out (FIFO) buffer, de-links fetch stage 301 (FIG. 3) from the rest of pipeline 300 for performance reasons. Each instruction in buffer 124 (FIG. 1) has an associated valid bit and an error bit. When the valid bit is set, the instruction associated with that valid bit is a valid instruction. When the error bit is set, the fetch of the instruction associated with that error bit was an erroneous transaction. Instruction buffer 124 includes an instruction buffer control circuit (not shown) that generates signals to pass data to and from instruction buffer 124 and that keeps track of the valid entries in instruction buffer 124, i.e., those with valid bits set.

In an exemplary embodiment, four bytes can be received into instruction buffer 124 in a given cycle. Up to five bytes, representing up to two virtual machine instructions, can be read out of instruction buffer 124 in a given cycle. Alternative embodiments, particularly those providing folding of multi-byte virtual machine instructions and/or those providing folding of more than two virtual machine instructions, provide higher input and output bandwidth. One skilled in the art will recognize a variety of suitable instruction buffer designs including, for example, alignment logic, and circular buffer designs. When a branch or trap is taken, all the entries in instruction buffer 124 are nullified and the branch/trap data moves to the top of instruction buffer 124.

In the embodiment of FIG. 1, a unified execution unit 140 is shown. However, in another embodiment, instruction decode unit 120, integer unit 142, and stack management unit 150 are considered a single integer execution functional unit, and floating point execution unit 143 is a separate optional functional unit. In still other embodiments, the various elements in the execution unit may be implemented using the execution unit of another processor. In general the various elements included in the various units of FIG. 1 are exemplary only of one embodiment. Each unit could be implemented with all or some of the elements shown. Again, the decision is largely dependent upon a price vs. performance trade-off.

Instruction Decode Unit

As explained above, virtual machine instructions are decoded in decode stage 302 (FIG. 3) of pipeline 300. In an exemplary embodiment, two bytes, that can correspond to two virtual machine instructions, are fetched from instruction buffer 124 (FIG. 1). The two bytes are decoded in parallel to determine if the two bytes correspond to two virtual machine instructions, e.g., a first load top of stack instruction and a second add top two stack entries instruction, that can be folded into a single equivalent operation. Folding refers to supplying a single equivalent operation corresponding to two or more virtual machine instructions.

In an exemplary hardware processor 100 embodiment, a single-byte first instruction can be folded with a second instruction. However, alternative embodiments provide folding of more than two virtual machine instructions, e.g., two to four virtual machine instructions, and of multi-byte virtual machine instructions, though at the cost of instruction decoder complexity and increased instruction bandwidth. See U.S. patent application Ser. No. 08/786,351, entitled "INSTRUCTION FOLDING FOR A STACK-BASED MACHINE", now U.S. Pat. No. 6,064,485 issued Feb. 15, 2000 to Marc Tremblay and James Michael O'Connor as inventors, assigned to the assignee of this application, which is incorporated herein by reference in its entirety. In the exemplary processor 100 embodiment, if the first byte, which corresponds to the first virtual machine instruction, is a multi-byte instruction, the first and second instructions are not folded.

An optional current object loader folder 132 exploits instruction folding, such as that described above, and in greater detail in U.S. patent application Ser. No. 08/786,351, filed Jan. 23, 1997, entitled "INSTRUCTION FOLDING FOR A STACK-BASED MACHINE" now U.S. Pat. No. 6,026,485 issued Feb. 15, 2000 to Marc Tremblay and James Michael O'Connor as inventors, assigned to the assignee of this application, which is incorporated herein by reference in its entirety, in virtual machine instruction sequences which simulation results have shown to be particularly frequent and therefore a desirable target for optimization. In particular, method invocations typically load an object reference for the corresponding object onto the operand stack and fetch a field from the object. Instruction folding allows this extremely common virtual machine instruction sequence to be executed using an equivalent folded operation.

Quick variants are not part of the virtual machine instruction set, and are invisible outside of a JAVA virtual machine implementation. However, inside a virtual machine implementation, quick variants have proven to be an effective optimization. Supporting writes for updates of various instructions to quick variants in a non-quick to quick translator cache 131 changes the normal virtual machine instruction to a quick virtual machine instruction to take advantage of the large benefits bought from the quick variants. In particular, as described in more detail in U.S. patent application Ser. No. 08/788,805, filed Jan. 23, 1997 entitled "NON-QUICK INSTRUCTION ACCELERATOR AND METHOD OF IMPLEMENTING SAME", now U.S. Pat. No. 6,065,108 issued May 16, 2000 to Marc Tremblay and James Michael O'Connor as inventors, assigned to the assignee of this application, which is incorporated herein by reference in its entirety, when the information required to initiate execution of an instruction has been assembled for the first time, the information is stored in a cache along with the value of program counter PC as tag in non-quick to quick translator cache 131 and the instruction is identified as a quick-variant. In one embodiment, this is done with self-modifying code.

Upon a subsequent call of that instruction, instruction decode unit 130 detects that the instruction is identified as a quick-variant and simply retrieves the information needed to initiate execution of the instruction from non-quick to quick translator cache 131. Non-quick to quick translator cache is an optional feature of hardware processor 100.

With regard to branching, a very short pipe with quick branch resolution is sufficient for most implementations. However, an appropriate simple branch prediction mechanism can alternatively be introduced, e.g., branch predictor circuit 133. Implementations for branch predictor circuit 133 include branching based on opcode, branching based on offset, or branching based on a two-bit counter mechanism.

The JAVA virtual machine specification defines an instruction invokenonvirtual, opcode 183, which, upon execution, invokes methods. The opcode is followed by an index byte one and an index byte two. Operand stack 423 contains a reference to an object and some number of arguments when this instruction is executed. Index bytes one and two are used to generate an index into the constant pool of the current class. The item in the constant pool at that index points to a complete method signature and class. Signatures are defined in Appendix I and that description is incorporated herein by reference.

The method signature, a short, unique identifier for each method, is looked up in a method table of the class indicated. The result of the lookup is a method block that indicates the type of method and the number of arguments for the method. The object reference and arguments are popped off this method's stack and become initial values of the local variables of the new method. The execution then resumes with the first instruction of the new method. Upon execution, instructions invokevirtual, opcode 182, and invokestatic, opcode 184, invoke processes similar to that just described. In each case, a pointer is used to lookup a method block. A method argument cache 134, that also is an optional feature of hardware processor 100, is used, in a first embodiment, to store the method block of a method for use after the first call to the method, along with the pointer to the method block as a tag.

Instruction decode unit 130 uses index bytes one and two to generate the pointer and then uses the pointer to retrieve the method block for that pointer in cache 134. This permits building the stack frame for the newly invoked method more rapidly in the background in subsequent invocations of the method. Alternative embodiments may use a program counter or method identifier as a reference into cache 134. If there is a cache miss, the instruction is executed in the normal fashion and cache 134 is updated accordingly. The particular process used to determine which cache entry is overwritten is not an essential aspect of this invention. A least-recently used criterion could be implemented, for example.

In an alternative embodiment, method argument cache 134 is used to store the pointer to the method block, for use after the first call to the method, along with the value of program counter PC of the method as a tag. Instruction decode unit 130 uses the value of program counter PC to access cache 134. If the value of program counter PC is equal to one of the tags in cache 134, cache 134 supplies the pointer stored with that tag to instruction decode unit 130. Instruction decode unit 130 uses the supplied pointer to retrieve the method block for the method. In view of these two embodiments, other alternative embodiments will be apparent to those of skill in the art.

Wide index forwarder 136, which is an optional element of hardware processor 100, is a specific embodiment of instruction folding for instruction wide. Wide index forwarder 136 handles an opcode encoding an extension of an index operand for an immediately subsequent virtual machine instruction. In this way, wide index forwarder 136 allows instruction decode unit 130 to provide indices into local variable storage 421 when the number of local variables exceeds that addressable with a single byte index without incurring a separate execution cycle for instruction wide.

Aspects of instruction decoder 135, particularly instruction folding, non-quick to quick translator cache 131, current object loader folder 132, branch predictor 133, method argument cache 134, and wide index forwarder 136 are also useful in implementations that utilize a software interpreter or just-in-time compiler, since these elements can be used to accelerate the operation of the software interpreter or just-in-time compiler. In such an implementation, typically, the virtual machine instructions are translated to an instruction for the processor executing the interpreter or compiler, e.g., any one of a Sun processor, a DEC processor, an Intel processor, or a Motorola processor, for example, and the operation of the elements is modified to support execution on that processor. The translation from the virtual machine instruction to the other processor instruction can be done either with a translator in a ROM or a simple software translator. For additional examples of dual instruction set processors, see U.S. patent application Ser. No. 08/787,618, filed Jan. 23, 1997, entitled "A PROCESSOR FOR EXECUTING INSTRUCTION SETS RECEIVED FROM A NETWORK OR FROM A LOCAL MEMORY" naming Marc Tremblay and James Michael O'Connor as inventors, assigned to the assignee of this application, which is incorporated herein by reference in its entirety, and which issued as U.S. Pat. No. 5,925,123 on Jul. 20, 1999.

Integer Execution Unit

Integer execution unit IEU, that includes instruction decode unit 130, integer unit 142, and stack management unit 150, is responsible for the execution of all the virtual machine instructions except the floating point related instructions. The floating point related instructions are executed in floating point unit 143. Integer execution unit IEU interacts at the front end with instructions cache unit 120 to fetch instructions, with floating point unit (FPU) 143 to execute floating point instructions, and finally with data cache unit (DCU) 160 to execute load and store related instructions. Integer execution unit IEU also contains microcode ROM 141 which contains instructions to execute certain virtual machine instructions associated with integer operations.

Integer execution unit IEU includes a cached portion of stack 400, i.e., stack cache 155. Stack cache 155 provides fast storage for operand stack and local variable entries associated with a current method, e.g., operand stack 423 and local variable storage 421 entries. Although, stack cache 155 may provide sufficient storage for all operand stack and local variable entries associated with a current method, depending on the number of operand stack and local variable entries, less than all of local variable entries or less than all of both local variable entries and operand stack entries may be represented in stack cache 155. Similarly, additional entries, e.g., operand stack and or local variable entries for a calling method, may be represented in stack cache 155 if space allows.

Stack cache 155 is a sixty-four entry thirty-two-bit wide array of registers that is physically implemented as a register file in one embodiment. Stack cache 155 has three read ports, two of which are dedicated to integer execution unit IEU and one to dribble manager unit 151. Stack cache 155 also has two write ports, one dedicated to integer execution unit IEU and one to dribble manager unit 151.

Integer unit 142 maintains the various pointers which are used to access variables, such as local variables and operand stack values, in stack cache 155. Integer unit 142 also maintains pointers to detect whether a stack cache hit has taken place. Runtime exceptions are caught and dealt with by exception handlers that are implemented using information in microcode ROM 141 and circuit 170.

Integer unit 142 contains a 32-bit ALU to support arithmetic operations. The operations supported by the ALU include: add, subtract, shift, and, or, exclusive or, compare, greater than, less than, and bypass. The ALU is also used to determine the address of conditional branches while a separate comparator determines the outcome of the branch instruction.

The most common set of instructions which executes cleanly through the pipeline is the group of ALU instructions. The ALU instructions read the operands from the top of stack 400 in decode stage 302 and use the ALU in execution stage 303 to compute the result. The result is written back to stack 400 in write-back stage 305. There are two levels of bypass which may be needed if consecutive ALU operations are accessing stack cache 155.

Since the stack cache ports are 32-bits wide in this embodiment, double precision and long data operations take two cycles. A shifter is also present as part of the ALU. If the operands are not available for the instruction in decode stage 302, or at a maximum at the beginning of execution stage 303, an interlock holds the pipeline stages before execution stage 303. The instruction cache unit interface of integer execution unit IEU is a valid/accept interface, where instruction cache unit 120 delivers instructions to integer decode unit 130 in fixed fields along with valid bits. Instruction decoder 135 responds by signaling how much byte aligner circuit 122 needs to shift, or how many bytes instruction decode unit 130 could consume in decode stage 302. The instruction cache unit interface also signals to instruction cache unit 120 the branch mis-predict condition, and the branch address in execution stage 303. Traps, when taken, are also similarly indicated to instruction cache unit 120.

Instruction cache unit 120 can hold integer unit 142 by not asserting any of the valid bits to instruction decode unit 130. Instruction decode unit 130 can hold instruction cache unit 120 by not asserting the shift signal to byte aligner circuit 122.

The data cache interface of integer execution unit IEU also is a valid-accept interface, where integer unit 142 signals, in execution stage 303, a load or store operation along with its attributes, e.g., non-cached and special stores to data cache controller 161 in data cache unit 160. Data cache unit 160 can return the data on a load, and control integer unit 142 using a data control unit hold signal. On a data cache hit, data cache unit 160 returns the requested data, and then releases the pipeline.

On store operations, integer unit 142 also supplies the data along with the address in execution stage 303. Data cache unit 165 can hold the pipeline in cache stage 304 if data cache unit 165 is busy, e.g., doing a line fill.

Floating point operations are dealt with specially by integer execution unit IEU. Instruction decoder 135 fetches and decodes floating point unit 143 related instructions. Instruction decoder 135 sends the floating point operation operands for execution to floating point unit 142 in decode state 302. While floating point unit 143 is busy executing the floating point operation, integer unit 142 halts the pipeline and waits until floating point unit 143 signals to integer unit 142 that the result is available. However, integer unit 142 can continue processing before the results are available if a stack renaming method and apparatus described in further detail below is utilized.

A floating point ready signal from floating point unit 143 indicates that execution stage 303 of the floating point operation has concluded. In response to the floating point ready signal, the result is written back into stack cache 155 by integer unit 142. Floating point load and stores are entirely handled by integer execution unit IEU, since the operands for both floating point unit 143 and integer unit 142 are found in stack cache 155.

Stack Management Unit

A stack management unit 150 stores information, and provides operands to execution unit 140. Stack management unit 150 also takes care of overflow and underflow conditions of stack cache 155.

In one embodiment, stack management unit 150 includes stack cache 155 that, as described above, is a three read port, two write port register file in one embodiment; a stack control unit 152 which provides the necessary control signals for two read ports and one write port that are used to retrieve operands for execution unit 140 and for storing data back from a write-back register or data cache 165 into stack cache 155; and a dribble manager 151 which speculatively dribbles data in and out of stack cache 155 into memory whenever there is an overflow or underflow in stack cache 155. In the exemplary embodiment of FIG. 1, memory includes data cache 165 and any memory storage interfaced by memory interface unit 110. In general, memory includes any suitable memory hierarchy including caches, addressable read/write memory storage, and secondary storage.

Dribble manager 151 also provides the necessary control signals for a single read port and a single write port of stack cache 155 which are used exclusively for background dribbling purposes.

In one embodiment, stack cache 155 is managed as a circular buffer which ensures that the stack grows and shrinks in a predictable manner to avoid overflows or overwrites. The saving and restoring of values to and from data cache 165 is controlled by dribbler manager 151 using high- and low-water marks, in one embodiment.

Stack management unit 150 provides execution unit 140 with two 32-bit operands in a given cycle. Stack management unit 150 can store a single 32-bit result in a given cycle.

Dribble manager 151 handles spills and fills of stack cache 155 by speculatively dribbling the data in and out of stack cache 155 from and to data cache 165. Dribble manager 151 generates a pipeline stall signal to stall the pipeline when a stack overflow or underflow condition is detected. Dribble manager 151 also keeps track of requests sent to data cache unit 160. A single request to data cache unit 160 is a 32-bit consecutive load or store request.

The hardware organization of stack cache 155 is such that, except for long operands (long integers and double precision floating-point numbers), implicit operand fetches for opcodes do not add latency to the execution of the opcodes. The number of entries in operand stack 423 (FIG. 4A) and local variable storage 422 that are maintained in stack cache 155 represents a hardware/performance trade-off. At least a few operand stack 423 and local variable storage 422 entries are required to get good performance. In the exemplary embodiment of FIG. 1, at least the top three entries of operand stack 423 and the first four local variable storage 422 entries are preferably represented in stack cache 155.

One key function provided by stack cache 155 (FIG. 1) is to emulate a register file where access to the top two registers is always possible without extra cycles. A small hardware stack is sufficient if the proper intelligence is provided to load/store values from/to memory in the background, therefore preparing stack cache 155 for incoming virtual machine instructions.

As indicated above, all items on stack 400 (regardless of size) are placed into a 32-bit word. This tends to waste space if many small data items are used, but it also keeps things relatively simple and free of lots of tagging or muxing. An entry in stack 400 thus represents a value and not a number of bytes. Long integer and double precision floating-point numbers require two entries. To keep the number of read and write ports low, two cycles to read two long integers or two double precision floating point numbers are required.

The mechanism for filling and spilling the operand stack from stack cache 155 out to memory by dribble manager 151 can assume one of several alternative forms. One register at a time can be filled or spilled, or a block of several registers filled or spilled at once. A simple scoreboarded method is appropriate for stack management. In its simplest form, a single bit indicates if the register in stack cache 155 is currently valid. In addition, some embodiments of stack cache 155 use a single bit to indicate whether the data content of the register is saved to stack 400, i.e., whether the register is dirty. In one embodiment, a high-water mark/low-water mark heuristic determines when entries are saved to and restored from stack 400, respectively (FIG. 4A).

Alternatively, when the top-of-the-stack becomes close to bottom 401 of stack cache 155 by a fixed, or alternatively, a programmable number of entries, the hardware starts loading registers from stack 400 into stack cache 155. For other embodiments of stack management unit 150 and dribble manager unit 151, see U.S. patent application Ser. No. 08/787,736, filed Jan. 23, 1997, entitled "A STACK MANAGEMENT UNIT AND METHOD FOR A PROCESSOR HAVING A STACK", now U.S. Pat. No. 6,038,643 issued Mar. 14, 2000 to Marc Tremblay and James Michael O'Connor as inventors, assigned to the assignee of this application, which is incorporated herein by reference in its entirety, and see also U.S. patent application Ser. No. 08/787,617, filed Jan. 23, 1997, entitled "METHOD FRAME STORAGE USING MULTIPLE MEMORY CIRCUITS" naming Marc Tremblay and James Michael O'Connor as inventors, assigned to the assignee of this application, which also is incorporated herein by reference in its entirety.

In one embodiment, stack management unit 150 also includes an optional local variable look-aside cache 153. Cache 153 is most important in applications where both the local variables and operand stack 423 (FIG. 4A) for a method are not located on stack cache 155. In such instances when cache 153 is not included in hardware processor 100, there is a miss on stack cache 155 when a local variable is accessed, and execution unit 140 accesses data cache unit 160, which in turn slows down execution. In contrast, with cache 153, the local variable is retrieved from cache 153 and there is no delay in execution.

Figure 4D:
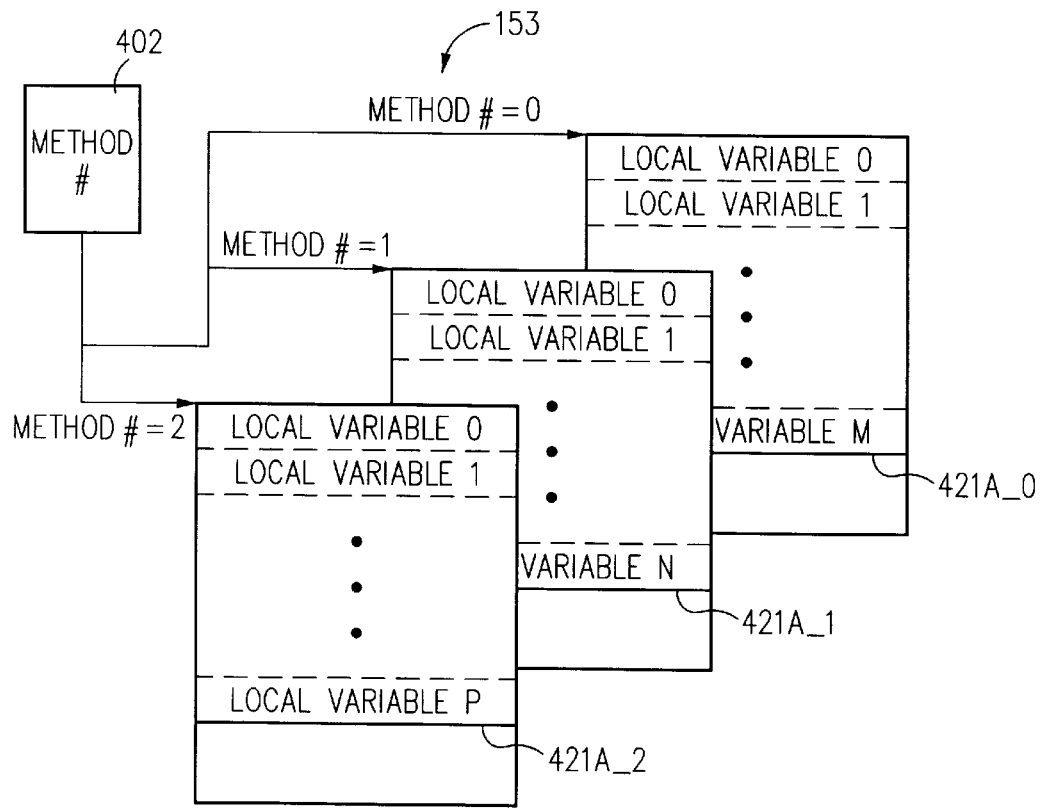
FIG. 4D is an illustration of one embodiment of the local variables look-aside cache in the stack management unit of FIG. 1.

One embodiment of local variable look-aside cache 153 is illustrated in FIG. 4D for method 0 to 2 on stack 400. Local variables zero to M, where M is an integer, for method 0 are stored in plane 421A_0 of cache 153 and plane 421A_0 is accessed when method number 402 is zero. Local variables zero to N, where N is an integer, for method 1 are stored in plane 421A_1 of cache 153 and plane 421A_1 is accessed when method number 402 is one. Local variables zero to P, where P is an integer, for method 1 are stored in plane 421A_2 of cache 153 and plane 421A_2 is accessed when method number 402 is two. Notice that the various planes of cache 153 may be different sizes, but typically each plane of the cache has a fixed size that is empirically determined.

When a new method is invoked, e.g, method 2, a new plane 421A_2 in cache 153 is loaded with the local variables for that method, and method number register 402, which in one embodiment is a counter, is changed, e.g., incremented, to point to the plane of cache 153 containing the local variables for the new method. Notice that the local variables are ordered within a plane of cache 153 so that cache 153 is effectively a direct-mapped cache. Thus, when a local variable is needed for the current method, the variable is accessed directly from the most recent plane in cache 153, i.e., the plane identified by method number 402. When the current method returns, e.g., method 2, method number register 402 is changed, e.g., decremented, to point at previous plane 421A-1 of cache 153. Cache 153 can be made as wide and as deep as necessary.

Data Cache Unit

Data cache unit 160 (DCU) manages all requests for data in data cache 165. Data cache requests can come from dribbling manager 151 or execution unit 140. Data cache controller 161 arbitrates between these requests giving priority to the execution unit requests. In response to a request, data cache controller 161 generates address, data and control signals for the data and tags RAMs in data cache 165. For a data cache hit, data cache controller 161 reorders the data RAM output to provide the correct data.

Data cache controller 161 also generates requests to I/O bus and memory interface unit 110 in case of data cache misses, and in case of non-cacheable loads and stores. Data cache controller 161 provides the data path and control logic for processing non-cacheable requests, and the data path and data path control functions for handling cache misses.

For data cache hits, data cache unit 160 returns data to execution unit 140 in one cycle for loads. Data cache unit 160 also takes one cycle for write hits. In case of a cache miss, data cache unit 160 stalls the pipeline until the requested data is available from the external memory. For both non-cacheable loads and stores, data cache 161 is bypassed and requests are sent to I/O bus and memory interface unit 110. Non-aligned loads and stores to data cache 165 trap in software.

Data cache 165 is a two-way set associative, write back, write allocate, 16-byte line cache. The cache size is configurable to 0, 1, 2, 4, 8, 16 Kbyte sizes. The default size is 8 Kbytes. Each line has a cache tag store entry associated with the line. On a cache miss, 16 bytes of data are written into cache 165 from external memory.

Each data cache tag contains a 20-bit address tag field, one valid bit, and one dirty bit. Each cache tag is also associated with a least recently used bit that is used for replacement policy. To support multiple cache sizes, the width of the tag fields also can be varied. If a cache enable bit in processor service register is not set, loads and stores are treated like non-cacheable instructions by data cache controller 161.

A single sixteen-byte write back buffer is provided for writing back dirty cache lines which need to be replaced. Data cache unit 160 can provide a maximum of four bytes on a read and a maximum of four bytes of data can be written into cache 161 in a single cycle. Diagnostic reads and writes can be done on the caches.

Memory Allocation Accelerator

In one embodiment, data cache unit 165 includes a memory allocation accelerator 166. Typically, when a new object is created, fields for the object are fetched from external memory, stored in data cache 165 and then the field is cleared to zero. This is a time consuming process that is eliminated by memory allocation accelerator 166. When a new object is created, no fields are retrieved from external memory. Rather, memory allocation accelerator 160 simply stores a line of zeros in data cache 165 and marks that line of data cache 165 as dirty. Memory allocation accelerator 166 is particularly advantageous with a write-back cache. Since memory allocation accelerator 166 eliminates the external memory access each time a new object is created, the performance of hardware processor 100 is enhanced.

Floating Point Unit

Floating point unit (FPU) 143 includes a microcode sequencer, input/output section with input/output registers, a floating point adder, i.e., an ALU, and a floating point multiply/divide unit. The microcode sequencer controls the microcode flow and microcode branches. The input/output section provides the control for input/output data transactions, and provides the input data loading and output data unloading registers. These registers also provide intermediate result storage.

The floating point adder-ALU includes the combinatorial logic used to perform the floating point adds, floating point subtracts, and conversion operations. The floating point multiply/divide unit contains the hardware for performing multiply/divide and remainder.

Floating point unit 143 is organized as a microcode engine with a 32-bit data path. This data path is often reused many times during the computation of the result. Double precision operations require approximately two to four times the number of cycles as single precision operations. The floating point ready signal is asserted one-cycle prior to the completion of given floating point operation. This allows integer unit 142 to read the floating point unit output registers without any wasted interface cycles. Thus, output data is available for reading one cycle after the floating point ready signal is asserted.

Execution Unit Accelerators

Since the JAVA Virtual Machine Specification is hardware independent, the virtual machine instructions are not optimized for a particular general type of processor, e.g., a complex instruction set computer (CISC) processor, an explicitly parallel instruction set computer (EPIC) processor, or a reduced instruction set computer (RISC) processor. In fact, some virtual machine instructions have a CISC nature and others a RISC nature. This dual nature complicates the operation and optimization of hardware processor 100.

For example, the JAVA virtual machine specification defines opcode 171 for an instruction lookupswitch, which is a traditional switch statement. The datastream to instruction cache unit 120 includes an opcode 171, identifying the N-way switch statement, that is followed by zero to three bytes of padding. The number of bytes of padding is selected so that first operand byte begins at an address that is a multiple of four. Herein, datastream is used generically to indicate information that is provided to a particular element, block, component, or unit.

Following the padding bytes in the datastream are a series of pairs of signed four-byte quantities. The first pair is special. A first operand in the first pair is the default offset for the switch statement that is used when the argument, referred to as an integer key, or alternatively, a current match value, of the switch statement is not equal to any of the values of the matches in the switch statement. The second operand in the first pair defines the number of pairs that follow in the datastream.

Each subsequent operand pair in the datastream has a first operand that is a match value, and a second operand that is an offset. If the integer key is equal to one of the match values, the offset in the pair is added to the address of the switch statement to define the address to which execution branches. Conversely, if the integer key is unequal to any of the match values, the default offset in the first pair is added to the address of the switch statement to define the address to which execution branches. Direct execution of this virtual machine instruction requires many cycles.

To enhance the performance of hardware processor 100, a look-up switch accelerator 145 is included in hardware processor 100. Look-up switch accelerator 145 includes an associative memory which stores information associated with one or more lookup switch statements. For each lookup switch statement, i.e., each instruction lookupswitch, this information includes a lookup switch identifier value, i.e., the program counter value associated with the lookup switch statement, a plurality of match values and a corresponding plurality of jump offset values.

Lookup switch accelerator 145 determines whether a current instruction received by hardware processor 100 corresponds to a lookup switch statement stored in the associative memory. Lookup switch accelerator 145 further determines whether a current match value associated with the current instruction corresponds with one of the match values stored in the associative memory. Lookup switch accelerator 145 accesses a jump offset value from the associative memory when the current instruction corresponds to a lookup switch statement stored in the memory and the current match value corresponds with one of the match values stored in the memory wherein the accessed jump offset value corresponds with the current match value.

Lookup switch accelerator 145 further includes circuitry for retrieving match and jump offset values associated with a current lookup switch statement when the associative memory does not already contain the match and jump offset values associated with the current lookup switch statement. Lookup switch accelerator 145 is described in more detail in U.S. patent application Ser. No. 08/788,811, filed Jan. 23, 1997, entitled "LOOK-UP SWITCH ACCELERATOR AND METHOD OF OPERATING SAME", now U.S. Pat. No. 6,076,141 issued Jun. 13, 2000 to Marc Tremblay and James Michael O'Connor as inventors, assigned to the assignee of this application, which is incorporated herein by reference in its entirety.

In the process of initiating execution of a method of an object, execution unit 140 accesses a method vector to retrieve one of the method pointers in the method vector, i.e., one level of indirection. Execution unit 140 then uses the accessed method pointer to access a corresponding method, i.e., a second level of indirection.

To reduce the levels of indirection within execution unit 140, each object is provided with a dedicated copy of each of the methods to be accessed by the object. Execution unit 140 then accesses the methods using a single level of indirection. That is, each method is directly accessed by a pointer which is derived from the object. This eliminates a level of indirection which was previously introduced by the method pointers. By reducing the levels of indirection, the operation of execution unit 140 can be accelerated. The acceleration of execution unit 140 by reducing the levels of indirection experienced by execution unit 140 is described in more detail in U.S. patent application Ser. No. 08/787,846, filed Jan. 23, 1997, entitled "REPLICATING CODE TO ELIMINATE A LEVEL OF INDIRECTION DURING EXECUTION OF AN OBJECT ORIENTED COMPUTER PROGRAM" naming Marc Tremblay and James Michael O'Connor as inventors, assigned to the assignee of this application, which is incorporated herein by reference in its entirety, and which issued as U.S. Pat. No. 5,970,242 on Oct. 19, 1999.

Getfield-putfield Accelerator

Other specific functional units and various translation lookaside buffer (TLB) types of structures may optionally be included in hardware processor 100 to accelerate accesses to the constant pool. For example, the JAVA virtual machine specification defines an instruction putfield, opcode 181, that upon execution sets a field in an object and an instruction getfield, opcode 180, that upon execution fetches a field from an object. In both of these instructions, the opcode is followed by an index byte one and an index byte two. Operand stack 423 contains a reference to an object followed by a value for instruction putfield, but only a reference to an object for instruction getfield.

Index bytes one and two are used to generate an index into the constant pool of the current class. The item in the constant pool at that index is a field reference to a class name and a field name. The item is resolved to a field block pointer which has both the field width, in bytes, and the field offset, in bytes.

An optional getfield-putfield accelerator 146 in execution unit 140 stores the field block pointer for instruction getfield or instruction putfield in a cache, for use after the first invocation of the instruction, along with the index used to identify the item in the constant pool that was resolved into the field block pointer as a tag. Subsequently, execution unit 140 uses index bytes one and two to generate the index and supplies the index to getfield-putfield accelerator 146. If the index matches one of the indexes stored as a tag, i.e., there is a hit, the field block pointer associated with that tag is retrieved and used by execution unit 140. Conversely, if a match is not found, execution unit 140 performs the operations described above. Getfield-putfield accelerator 146 is implemented without using self-modifying code that was used in one embodiment of the quick instruction translation described above.

In one embodiment, getfield-putfield accelerator 146 includes an associative memory that has a first section that holds the indices that function as tags, and a second section that holds the field block pointers. When an index is applied through an input section to the first section of the associative memory, and there is a match with one of the stored indices, the field block pointer associated with the stored index that matched in input index is output from the second section of the associative memory.

Bounds Check Unit

Bounds check unit 147 (FIG. 1) in execution unit 140 is an optional hardware circuit that checks each access to an element of an array to determine whether the access is to a location within the array. When the access is to a location outside the array, bounds check unit 147 issues an active array bound exception signal to execution unit 140. In response to the active array bound exception signal, execution unit 140 initiates execution of an exception handler stored in microcode ROM 141 that in handles the out of bounds array access.

In one embodiment, bounds check unit 147 includes an associative memory element in which is stored a array identifier for an array, e.g., a program counter value, and a maximum value and a minimum value for the array. When an array is accessed, i.e, the array identifier for that array is applied to the associative memory element, and assuming the array is represented in the associative memory element, the stored minimum value is a first input signal to a first comparator element, sometimes called a comparison element, and the stored maximum value is a first input signal to a second comparator element, sometimes also called a comparison element. A second input signal to the first and second comparator elements is the value associated with the access of the array's element.

If the value associated with the access of the array's element is less than or equal to the stored maximum value and greater than or equal to the stored minimum value, neither comparator element generates an output signal. However, if either of these conditions is false, the appropriate comparator element generates the active array bound exception signal. A more detailed description of one embodiment of bounds check unit 147 is provided in U.S. patent application Ser. No. 08/786,352, filed Jan. 23, 1997 entitled "PROCESSOR WITH ACCELERATED ARRAY ACCESS BOUNDS CHECKING" naming Marc Tremblay, James Michael O'Connor, and William N. Joy as inventors, assigned to the assignee of this application, which is incorporated herein by reference in its entirety, and which issued as U.S. Pat. No. 6,014,723 on Jan. 11, 2000.

The JAVA Virtual Machine Specification defines that certain instructions can cause certain exceptions. The checks for these exception conditions are implemented, and a hardware/software mechanism for dealing with them is provided in hardware processor 100 by information in microcode ROM 141 and program counter and trap control logic 170. The alternatives include having a trap vector style or a single trap target and pushing the trap type on the stack so that the dedicated trap handler routine determines the appropriate action.

Figure 5:
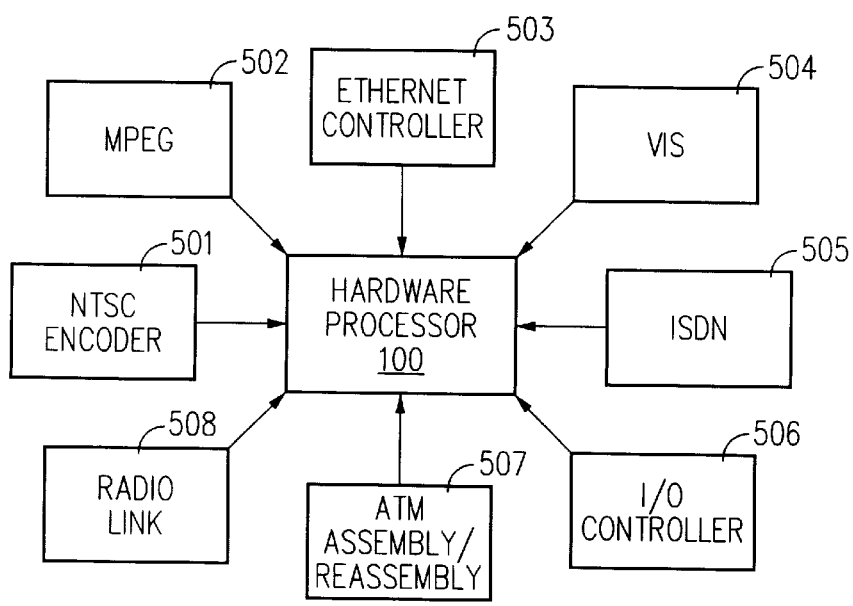
FIG. 5 illustrates several possible add-ons to the hardware processor of FIG. 1.

No external cache is required for the architecture of hardware processor 100. No translation lookaside buffers need be supported. FIG. 5 illustrates several possible add-ons to hardware processor 100 to create a unique system. Circuits supporting any of the eight functions shown, i.e., NTSC encoder 501, MPEG 502, Ethernet controller 503, VIS 504, ISDN 505, I/O controller 506, ATM assembly/reassembly 507, and radio link 508 can be integrated into the same chip as hardware processor 100 of this invention.

Stack Renaming Unit

Figure 6:
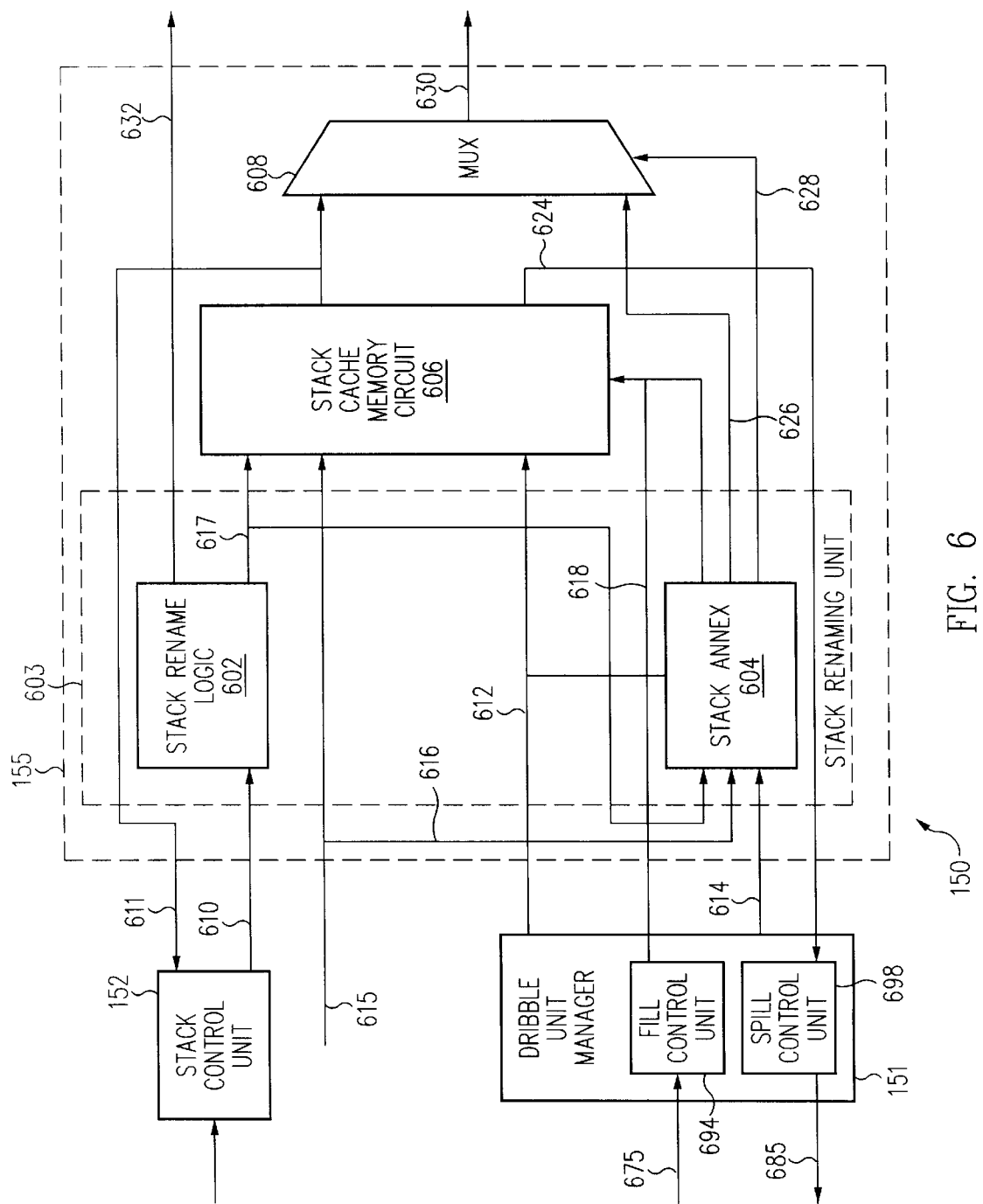
FIG. 6 is a block diagram of one embodiment of a stack management unit which uses a stack renaming unit designed in accordance with the present invention.

FIG. 6 is a block diagram of one embodiment of a stack management unit 150 which uses a stack cache 155. In this embodiment, stack cache 155 implements a stack renaming unit 603 of the present invention. Stack renaming unit 603 is designed to improve performance of stack cache 155 by allowing more than one functional unit in a stack based processor to substantially simultaneously access stack 400 (FIG. 4A). When there are no structural hazards (i.e. contention for the same hardware resources), embodiments of the present invention provide a technique for multiple functional units in hardware processor 100 (FIG. 1) to process instructions substantially in parallel. This is a significant improvement over prior art stack mechanisms which serialize access to the stack and therefore under utilize the processing power available from multiple functional units within execution unit 140 (FIG. 1) and other areas within hardware processor 100. As will be apparent from the discussion below, stack renaming unit 603 (FIG. 6) is an optional performance enhancement to the operation of stack cache 155. Accordingly, one embodiment of stack cache 155 can operate at acceptable performance levels in stack management unit 150 without stack renaming unit 603 of the present invention.

Referring to FIG. 6, stack management unit 150 serves as a high speed buffer between stack 400 (FIG. 4A) and functional units in hardware processor 100 (FIG. 1). Each functional unit in hardware processor 100 (FIG. 1) accesses stack management unit 150 as if stack management unit 150 were stack 400 (FIG. 4A). Stack management unit 150 automatically transfers data between stack management unit 150 and stack 400 (FIG. 4A) as necessary to improve the throughput of data between stack 400 and hardware processor 100. In FIG. 1, if hardware processor 100 requires a data word which is not cached in stack management unit 150, data cache unit 160 retrieves the required data word and places the requested data word at the top of stack cache 155.

In FIG. 6, stack management unit 150 includes a stack cache 155, a-dribble manager unit 151, and a stack control unit 152. Stack control unit 152 is coupled to stack cache 155 over stack control output port 610 and stack control input port 611. Stack control input port 611 monitors input signals from stack cache 155 and provides control signals over stack control output port 610 to operate stack cache 155.

Each functional unit in hardware processor 100 (FIG. 1) is coupled to stack cache 155 via a real stack input port 615, also known as a real stack address input port 615. Real stack input port 615 allows functional units to write directly to a physical address within a stack cache memory circuit 606.

Unlike prior art stack cache techniques, a functional unit executing an instruction can access stack cache memory circuit 606 of the present invention using a specific address or base and offset address location. Prior art stack mechanisms are limited to accessing a stack sequentially using the address associated with the current top-of-stack pointer. For example, in the present invention an instruction executed on a functional unit writes the results directly to stack cache memory circuit 606 using areal addresses contained within stack cache memory circuit 606. In one aspect, embodiments of the present invention are advantageous because updates to stack cache memory circuit 606 can be done in parallel rather than sequentially using a top-of-stack pointer.

In one embodiment, stack cache 155 includes stack cache memory circuit 606 coupled to stack renaming unit 603 of the present invention. Stack cache memory circuit 606 can be implemented as a series of storage elements which can be individually addressed with a corresponding series of unique real stack addresses. Functional units use the real stack address to address the contents of a particular storage element within stack cache memory circuit 606. Typically, stack cache memory circuit 606 is a fast memory device such as a register file, SRAM, or SDRAM; however, slower memory devices such as DRAM can also be used.

There are at least two ways for a functional unit to keep track of and receive data from the stack in the present invention. A first technique employs a scoreboard unit to control instruction execution and allow out of order instruction execution. The typical scoreboard attempts to issue multiple instructions in parallel by controlling instruction issuance and instruction execution. If the scoreboard does not detect data hazards or structural hazards, multiple functional units on a processor can process instructions out of order and in parallel thus increasing overall processing throughput. In one embodiment, the scoreboard unit (not shown) receives a real stack address over real stack address output port 632 and uses the information to generate a table of dependencies and resource availability. The real stack address is used to access one or more of the plurality of storage elements in stack cache memory circuit 606. Specifically, the scoreboard can track the status of instructions, the status of particular functional units on a processor and the status of register results. The data stored in each of the plurality of storage elements is provided to one or more functional units as required by the instruction and controlled by the scoreboard. For example, a scoreboard can detect when two operand values from the stack are available and can be provided to a floating point multiply unit. The functions and constitutions of such a scoreboard unit will be understood by those skilled in the art and are discussed in Hennessy and Patterson, "Computer Architecture A Quantitative Approach", pages 242–262, Morgan Kaufman Publishers, 1996, which is incorporated herein by reference in the entirety for all purposes.

A second technique provides the real stack address directly to the functional units. These functional units use the real stack address to access one or more of the plurality of storage elements in stack cache memory circuit 606. A functional unit provides a real stack address over real stack input port 615 to "push" a new value on the stack or stack annex 604 via stack rename logic output port 617. It can be appreciated that although one embodiment of the present invention utilizes the second technique discussed above, an alternative embodiment could be implemented by one skilled in the art utilizing the first technique of using a scoreboard as well. Both such embodiments are viable solutions to the problem of managing instructions which execute out of order.

Stack rename unit 603 includes a top-of-stack indicator (not shown in FIG. 6) to determine which element in stack cache memory circuit 606 should be "popped" off stack 400 (FIG. 4) and provided over real stack address output port 632. The top-of-stack indicator provides access to one or more values located at one or more corresponding sequential logical stack addresses in a stack. For example, the top-of-stack indicator is stored in register OPTOP (FIG. 4A) in register set 144 (FIG. 1) and contains a pointer OPTOP to the top of stack 400 (FIG. 4) as previously discussed above. Embodiments of the present invention map the logical stack address in the top-of-stack indicator to a real stack address in stack cache memory circuit 606 where the data is stored. The logical stack address to real stack address mapping is one novel aspect of the present invention which allows functional units to access storage elements in stack cache memory circuit 606 out of sequential order. For more information on the hardware based stack processor discussed above see U.S. patent application Ser. No. 08/788,807, "A HARDWARE BASED VIRTUAL MACHINE PROCESSOR", filed Jan. 23, 1997, now U.S. Pat. No. 6,021,469 issued Feb. 1, 2000 to Marc Tremblay and James Michael O'Connor, assigned to the assignee of the present invention, and incorporated herein by reference in the entirety for all purposes. Popping and pushing values on a stack using embodiments of the present invention are discussed in further detail below.

In the embodiment of FIG. 6, access to stack cache memory circuit 606 is controlled by stack control unit 152 and stack renaming unit 603.

Stack renaming unit 603 maps one or more logical stack addresses to one or more real stack addresses utilizing a stack rename logic 602 and a stack annex 604. Stack rename logic 602 includes lookup logic (not shown in FIG. 6) to generate a real stack address within stack memory circuit cache 606 from a corresponding logical stack address. Real stack addresses are provided to functional units over real stack address output port 632 and to stack cache memory circuit 606 over stack rename logic output port 617. Data contained within a storage element in stack cache memory circuit 606 is addressed using a real stack address. When the storage element in stack memory circuit 606 is being used by a functional unit, stack rename logic 602 maps around the real stack address within stack cache memory circuit 606. Stack rename logic 602 provides the next real stack address in stack cache memory circuit 606 not currently being used to store data. In one embodiment, a 1-bit scoreboard within stack cache memory circuit 606 keeps track of which real stack addresses in stack memory circuit 606 are currently in use by a functional unit and are marked as "busy". Details on the operation of stack rename logic 602 is discussed in further detail below.

In one embodiment, the functional units in hardware processor 100 in FIG. 1 include integer unit 140, floating point unit 143, execution unit 140, as well as memory interface unit 110 used for data cache misses and non-cacheable loads and stores (FIG. 1). Stack renaming unit 603 (FIG. 6) of the present invention allows multiple functional units to access stack 400 (FIG. 4A) even when a previous functional unit has not completed using the top of stack. For example, if a load/store functional unit is busy loading data into the top of stack, stack rename logic 602 in stack renaming unit 603 adjusts the top of stack to the next available real stack address within stack memory circuit cache 606. A functional unit uses the next available real stack address during the next stack operation. In one embodiment, a functional unit receives the real stack address directly over real stack address output port 632 (FIG. 6). Real stack address output port 632 typically carries one or more real stack addresses corresponding to the number of operands a functional unit requires for operation. The functional unit stores these real stack addresses while the functional unit generates a result. Later, the functional unit uses the real stack addresses to update one or more storage elements in stack cache memory circuit 606 by accessing stack cache memory circuit 606 through real stack input port 615. Typically, this update occurs when the functional unit has generated results or finished processing the information in the background. Other functional units do not attempt to access stack values within stack cache memory 606 until the 1-bit scoreboard within the stack memory circuit cache 606 indicates that the information is available.

Stack annex 604 operates as a temporary pipeline register capable of holding one or more data values. Stack annex 604 is used to keep the execution order of a series of stack instructions intact even when some instructions may complete out of order. For example, stack renaming unit 603 of the present invention tracks when multiple instructions issued substantially in parallel access stack cache memory circuit 606 and complete out of order. Out of order completion occurs when the younger instruction requires only a few cycles for execution and the older instruction requires much more than a few cycles to complete an operation. Essentially, a younger instruction (i.e. later in program order) finishes executing before an older instruction (i.e. one that is later in program order). When this happens, stack annex 604 holds the results from younger instructions until the older instructions successfully complete execution. Results stored in stack annex 604 may be written back into stack cache memory circuit 606 using stack annex data port 612 and stack annex address port 618. Alternatively, results may be forwarded directly over stack annex output 626 and MUX 608 to a functional unit waiting for the particular data.

Results contained in stack annex 604 can also be provided immediately by selecting a hit-bit line 628 coupled to MUX 608. This circuitry improves performance by bypassing stack cache memory circuit 606 when a value contained in stack annex 604 is needed immediately. Accordingly, hit-bit line 628 selects MUX 608 to use stack annex output 626 for output over a stack data output port 630. Alternatively, if a value is not contained in stack annex 604, hit-bit line 628 selects MUX 608 to provide output from stack cache memory circuit 606 over stack data output port 630. Details on temporary pipeline registers such as stack annex 604 are the subject of U.S. patent application Ser. No. 08/153,814, filed Nov. 17, 1993, entitled "TEMPORARY PIPELINE REGISTER FILE FOR A SUPERPIPELINED SUPERSCALAR PROCESSOR", authored by Robert Yung, William Joy, and Marc Tremblay, assigned to the assignee of the present invention, and incorporated herein by reference in the entirety, which issued as U.S. Pat. No. 6,026,485, on Feb. 15, 2000.

As briefly discussed above, dribble manager unit 151 controls the transfer of data between stack 400 (FIG. 4A) and stack cache memory circuit 606. In one embodiment, the transfer of data between stack 400 (FIG. 4A) and stack cache memory circuit 606 goes through data cache unit 160 (FIG. 1). Dribble manager unit 151 includes a fill control unit 694 (FIG. 6) and a spill control unit 698. In one embodiment of dribble manager unit 151, fill control unit 694 and spill control unit 698 function independently. A high-water mark/low-water mark heuristic determines when entries in stack cache memory circuit 606 are saved to and restored from stack 400 (FIG. 4A), respectively. In accordance with the present invention, the high-water mark and low-water mark depends on the entries contained within stack cache memory circuit 606 as indicated by stack rename logic 602 (FIG. 6). If the fill condition exists, fill control unit 694 transfers data words from stack 400 (FIG. 4A) over a write port 675 to stack cache memory circuit 606 (FIG. 6). Spill control unit 698 determines if a spill condition exists. If a spill condition exists, spill control unit 698 transfers data words from stack cache memory circuit 606 to stack 400 (FIG. 4A) through a read port 685 (FIG. 6). Write port 675 and read port 685 allow transfers between stack 400 (FIG. 4A) and stack cache memory circuit 606 (FIG. 6) to occur substantially simultaneously with reads and writes as controlled by stack control unit 152. If contention for read and write ports of stack cache memory circuit 606 is not important, dribble manager unit 151 can share read and write ports with stack control unit 152.

Figure 7:
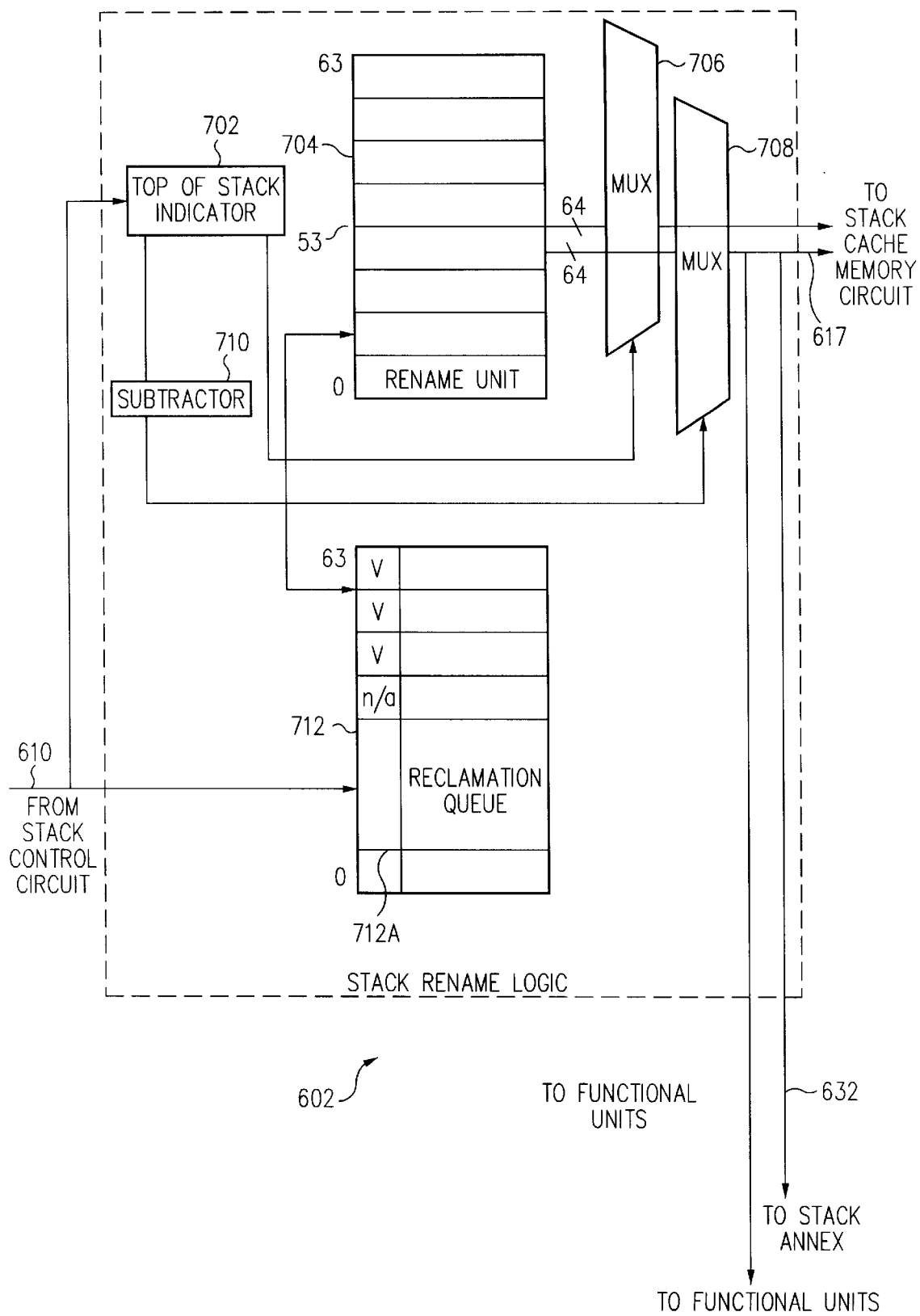
FIG. 7 is a high level circuit diagram illustrating stack rename logic designed in accordance with the present invention.

Referring now to FIG. 7, a high level circuit diagram illustrates a stack rename logic 602 designed in accordance with the present invention. In one embodiment, stack rename logic 602 includes a top of stack indicator 702, a rename unit 704, a first operand MUX 706, a second operand MUX 708, a subtractor 710, and a queue memory circuit 712, also known as a reclamation queue 712 or queue 712. Stack rename logic 602 receives control signals from stack control unit 152 over stack control output port 610. As previously discussed, stack rename logic 602 operates to translate a logical stack address in top of stack indicator 702 into the corresponding real stack addresses in stack cache memory circuit 606 (FIG. 6).

Top of stack indicator 702 is a counter device which sequences through addresses in rename unit 704. In one embodiment, top of stack indicator is a 6-bit counter which sequences through address numbers 0 through 63 as the top of stack is modified.

Rename unit 704 initially contains the addresses of storage elements in stack cache memory circuit 606 (FIG. 6) which are available and not currently in use by a functional unit. In one embodiment, storage elements in rename unit 704 are implemented using 6-bit wide register units. The 6-bit width corresponds to the 64 byte depth of the stack cache memory circuit 606 (FIG. 6) used in one embodiment. Those skilled in the art will understand that a deeper stack cache memory circuit 606 (FIG. 6) would require a correspondingly wider bit width in the corresponding circuitry.

First operand MUX 706 and second operand MUX 708 receives the address values from top of stack indicator and selects the real stack address values from rename unit 704. In one embodiment, MUX 706 and MUX 708 are implemented using 64:1 MUXes. Subtractor 710 coupled to second operand MUX 708 decrements top of stack indicator 702 to access the second operand. Those skilled in the art will understand that additional operands and/or local variable pointers (such as the VARs local variable pointer illustrated in FIG. 4A) will require additional circuitry substantially similar to the circuit elements discussed above for the first and second operands. Thus, an alternative embodiment may include more additional MUXes and related support circuitry than explicitly disclosed herein and in FIG. 7. The operation of rename unit 704 can be further discussed by way of example. For instance, assume address 53 is the top of stack in stack cache memory circuit 606 (FIG. 6). To represent this situation, top of stack indicator 702 (FIG. 7) is set to contain the value 0 and address 0 in rename unit 704 would hold the value 53. Accordingly, this arrangement would indicate that address 53 in stack cache memory circuit 606 (FIG. 6) is holding the current top of stack value. Essentially, the value in top of stack indicator 702 (FIG. 7) is an indirect reference to the address of the actual top of stack in stack cache memory circuit 606 (FIG. 6).

Embodiments of the present invention can also be used to map around addresses in stack cache memory circuit which currently in use by another functional unit. For example, if address 0 in stack cache memory circuit 606, such as address 53, is assigned to a busy functional unit, top of stack indicator 702 (FIG. 7) is incremented to a subsequent address. This subsequent address, such as address 1, allows other functional units to access stack cache memory circuit 606 (FIG. 6) at an address other than the address which is currently in use, such as address 53. Meanwhile, address 53 is copied from address 0 in rename unit 704 (FIG. 7) and assigned to the functional unit to access address 53 in stack cache memory circuit 606. Renaming the top of stack in this manner maps around the top of stack and allows other functional units to access a new top of stack before the functional unit has completed executing. One or more bits in a scoreboard unit (not shown) are used to determine which functional units are assigned which addresses in stack cache memory circuit 606. As discussed above, scoreboard unit keeps track of addresses being used in stack cache memory circuit 606 and the functional units which may depend on these addresses.

Generally, an address corresponding to an entry in stack cache memory circuit 606 (FIG. 6) can be in one or more places during operation of the present invention. In one embodiment, an address can either be located in rename circuit 704 (FIG. 7), as discussed above, or stored in reclamation queue 712. Reclamation queue 712 holds the addresses in stack cache memory circuit 606 which are not in use by a functional unit. Addresses in reclamation queue 712 are used to replenish address values used in rename unit 704. In one embodiment, reclamation queue 712 is 6-bits wide and 64 units deep and contains a list of addresses within stack cache memory circuit 606 (FIG. 6). A valid bit 712A (FIG. 7) indicates which addresses in reclamation queue 712 have been reclaimed and can be moved to rename unit 704. Typically, addresses in stack cache memory circuit 606 are reclaimed from a functional unit and inserted into reclamation queue 712 when the functional unit completes execution and when the item has been removed from the stack by subsequent operations. For example, a subsequent operation can remove the item off the stack by performing a stack pop operation. In one embodiment, the addresses are moved from reclamation queue 712 in a first-in-first-out basis into rename unit 704 when rename unit 704 has an empty storage element.

As discussed above, stack control unit 152 (FIG. 6) provides control signals over stack control output port 619 to stack rename logic 602. Signals generated over stack control output port 610 provide numerous functions. For example, stack control unit 152 (FIG. 6) is operatively coupled to stack rename logic 602 and provides signals which increment or decrement top of stack indicator 702 as required by functional units processing instructions. Modifying top of stack indicator 702 is a novel aspect of the present invention which allows for mapping around stack cache addresses in use by a functional unit. Further, stack control unit 152 also provides timing control signals, such as clock enable, to move reclaimed addresses from reclamation queue 712 to rename unit 704.

In operation, embodiments of the present invention have at least two different modes of working with stack 400 (FIG. 4A) which are of interest. One mode of operating the present invention relates to pushing data on stack 400 (FIG. 4A) and a second mode of operating relates to popping data off of stack 400. Both modes of operation discussed in further detail below facilitate the exchange of data between a substantially simultaneous or, alternatively, a non-sequential manner between one or more functional units and stack 400 (FIG. 4A). Typically, stack control unit 152 (FIG. 1) contains logic circuitry for operating embodiments of the present invention to perform each of these different operating modes. Those skilled in the art of computer architecture will understand how to implement logic circuits corresponding to the flowcharts provided in the detailed disclosure herein.

Figure 8:
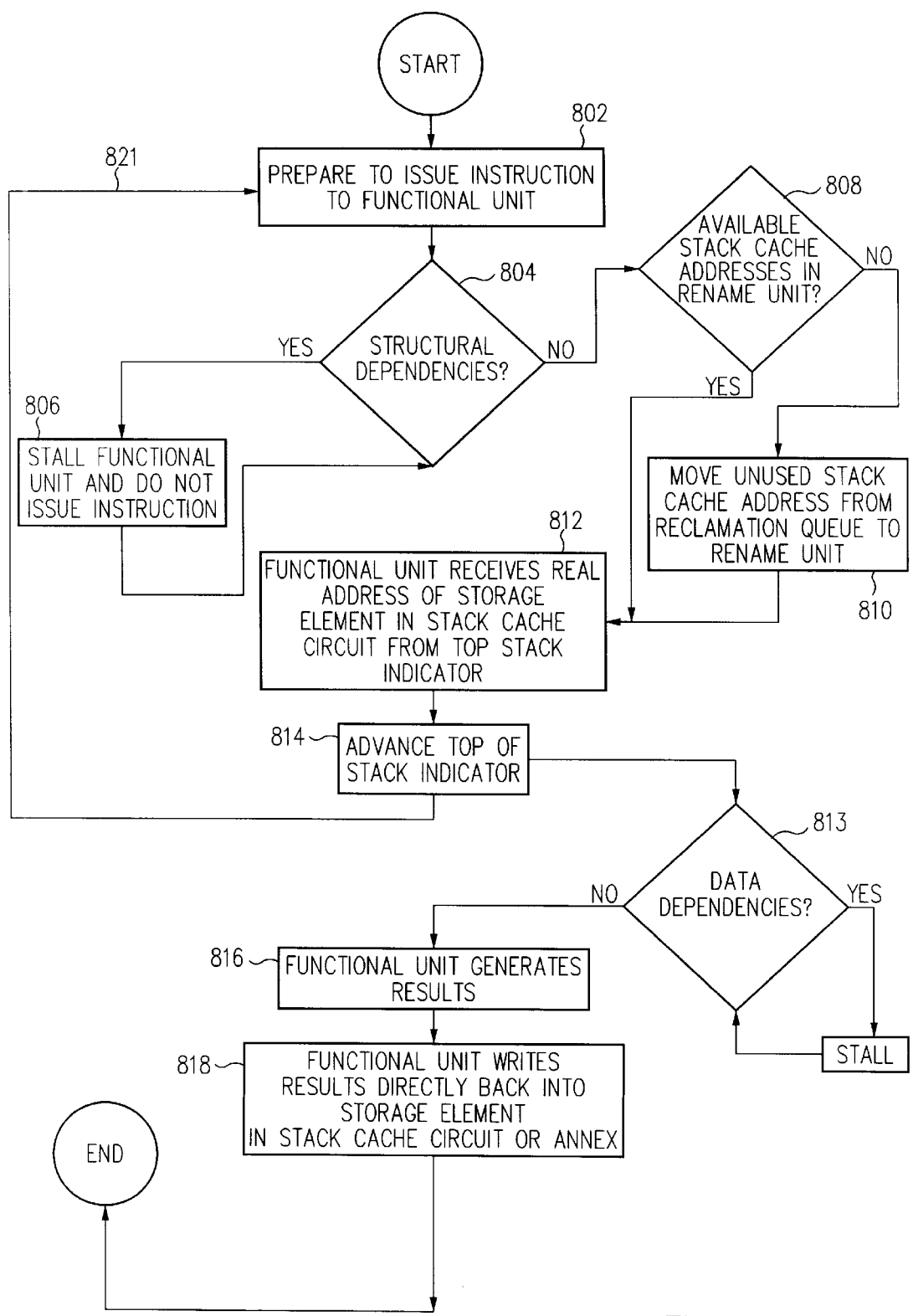
FIG. 8 is a flowchart illustrating the overall steps used by one embodiment of the present invention to facilitate pushing data onto a stack.

Referring now to FIG. 8, a flowchart illustrates the overall steps used by one embodiment of the present invention to facilitate pushing data onto stack 400 (FIG. 4A). The "load" instruction typically causes a stack processor to push data onto the stack. Initially, an instruction is issued to a functional unit on the processor 100 (FIG. 1) at step 802 in FIG. 8. The functional unit issuing the instruction prepares to perform a particular operation which will generate a particular result. For example, a floating point multiply instruction issued to floating point unit 143 in FIG. 1 will initiate a floating point multiplication operation.

Next, in FIG. 8 processing transfers from step 802 to determination step 804 where a dependency check is made to determine if there are any structural dependencies associated with stack 400 (FIG. 4A) as indicated by top of stack indicator 702 (FIG. 7). A structural dependency occurs when a portion of the hardware required by an instruction is currently in use by another instruction. If a structural dependency is found, the functional unit can not continue processing the instruction and control passes to step 806 (FIG. 8) where the functional unit stalls and waits until the dependency is resolved. For example, a structural dependency can occur when an attempt is made to issue an additional instruction to a functional unit already executing a maximum capacity of instructions.

When no structural dependencies are found in determination step 804 in FIG. 8, processing transfers to determination step 808. At determination step 808, rename unit 704 (FIG. 7) is checked for an available stack cache address to store the results generated by the functional unit. In one embodiment, if the top of stack indicator 702 does not point to an available stack cache address, processing transfers to step 810 in FIG. 8 where an unused stack cache address is moved from reclamation queue 712 (FIG. 7) and inserted in rename unit 704 at an offset indicated by top of stack indicator 702. The stack cache address moved into rename unit 704 becomes available for storing data values such as produced by the functional unit and processing transfers to step 812 in FIG. 8. However, if top of stack indicator 702 (FIG. 7) does initially point to an available stack cache address, processing transfers from determination step 808 in FIG. 8 directly to step 812 and it is not necessary to recover a stack cache address from reclamation queue 712 (FIG. 7). In another embodiment, stack cache addresses are recovered from reclamation queue 712 when rename unit 704 has storage units capable of storing additional stack cache addresses.

At step 812 in FIG. 8, embodiments of the present invention generate a real stack cache memory address in stack cache memory circuit 606 (FIG. 6). First operand MUX 706 (FIG. 7) selects a real stack cache memory address contained in rename unit 704 based upon the value contained in top of stack indicator 702. Essentially, rename unit 704 maps a logical stack address value contained in top of stack indicator 702 to a real stack cache memory address. The real stack cache memory address is provided to the functional unit.

In one embodiment, the real stack cache memory address is copied from rename unit 704 (FIG. 7) and temporarily stored in the functional unit while the functional unit completes calculating a given operation. When the functional unit has completed the operation, the real stack cache memory address is reclaimed as discussed in further detail below. Alternatively, a scoreboard is used to keep track of the stack cache memory address copied from the rename unit 704. Instead of storing the real stack cache memory address in the functional unit, the scoreboard is used to determine when the real stack cache memory address is no longer in use or when data dependencies exist between instructions.

Processing continues with step 814 in FIG. 8 where top of stack indicator 702 (FIG. 7) is advanced to the next element in rename unit 704. The real stack cache address in rename unit 704 corresponding to top of stack indicator 702 is established as the new top of stack in stack cache memory circuit 606 (FIG. 6). This aspect of the present invention maps around the previous top of stack and allows other functional units to access the stack in a substantially simultaneous manner. Accordingly, between step 814 and step 816 in FIG. 8 other functional units can continue to process instructions which access stack 400 (FIG. 4A).

At step 816 in FIG. 8, the functional unit discussed above generates a result which is placed back on stack 400 (FIG. 4A). Unlike the prior art, the functional unit does not use a top of stack indicator to update stack 400. Instead, the functional unit uses the real stack cache address provided in step 812 in FIG. 8 to update a storage element in stack cache memory circuit 606 (FIG. 6) directly. The functional unit which updates stack cache memory 606 notifies other functional units, dependent on this data, that the data is available for use. In one embodiment, stack annex mechanism 604 (FIG. 6) can be used to store results, update stack cache memory circuit 606, resolve data dependencies, and notify other functional units that the data is available for use. Details on such a stack annex are discussed in "TEMPORARY PIPELINE REGISTER FILE FOR A SUPERPIPELINED SUPERSCALAR PROCESSOR" previously incorporated by reference above. As an alternative to a Temporary Pipeline register File discussed above, separate lines coupled between each different functional unit can be used to communicate status and data for results generated by a functional unit.

At step 813, a given functional unit can also stall while waiting for the results associated with a particular address in stack cache memory circuit 606 (FIG. 6). While one functional unit stalls waiting for results, step 814 (FIG. 8) allows other instructions to access other addresses in stack cache memory circuit 606 (FIG. 6) by advancing top of stack indicator 702 (FIG. 7). With respect to these other addresses, control transfers from step 814 (FIG. 8) to step 802 where the above steps 802 through 814 are repeated in a substantially similar manner for another instruction and corresponding functional unit. In one embodiment, top of stack indicator 702 (FIG. 7) is implemented as a sequential counter mechanism which provides addresses for stack cache memory circuit 606 in a circular queue manner.

Real stack cache memory address provided in step 812 in FIG. 8 is reclaimed at step 818. Typically, a stack cache memory address is reclaimed when all data dependencies have been resolved, no other functional unit requires the data results, and data results have removed from cache and returned to the stack.

Once data dependencies are resolved, processing continues at step 816 where the functional unit generates a result. Those skilled in the art will understand that generating such a result can take a typical functional unit, such as a floating point multiplication unit, multiple cycles to access memory and/or generate results. These results are written back into a particular storage element in stack cache memory circuit 606 (FIG. 6) or stack annex 604 at step 818 in FIG. 8.

Figure 9:
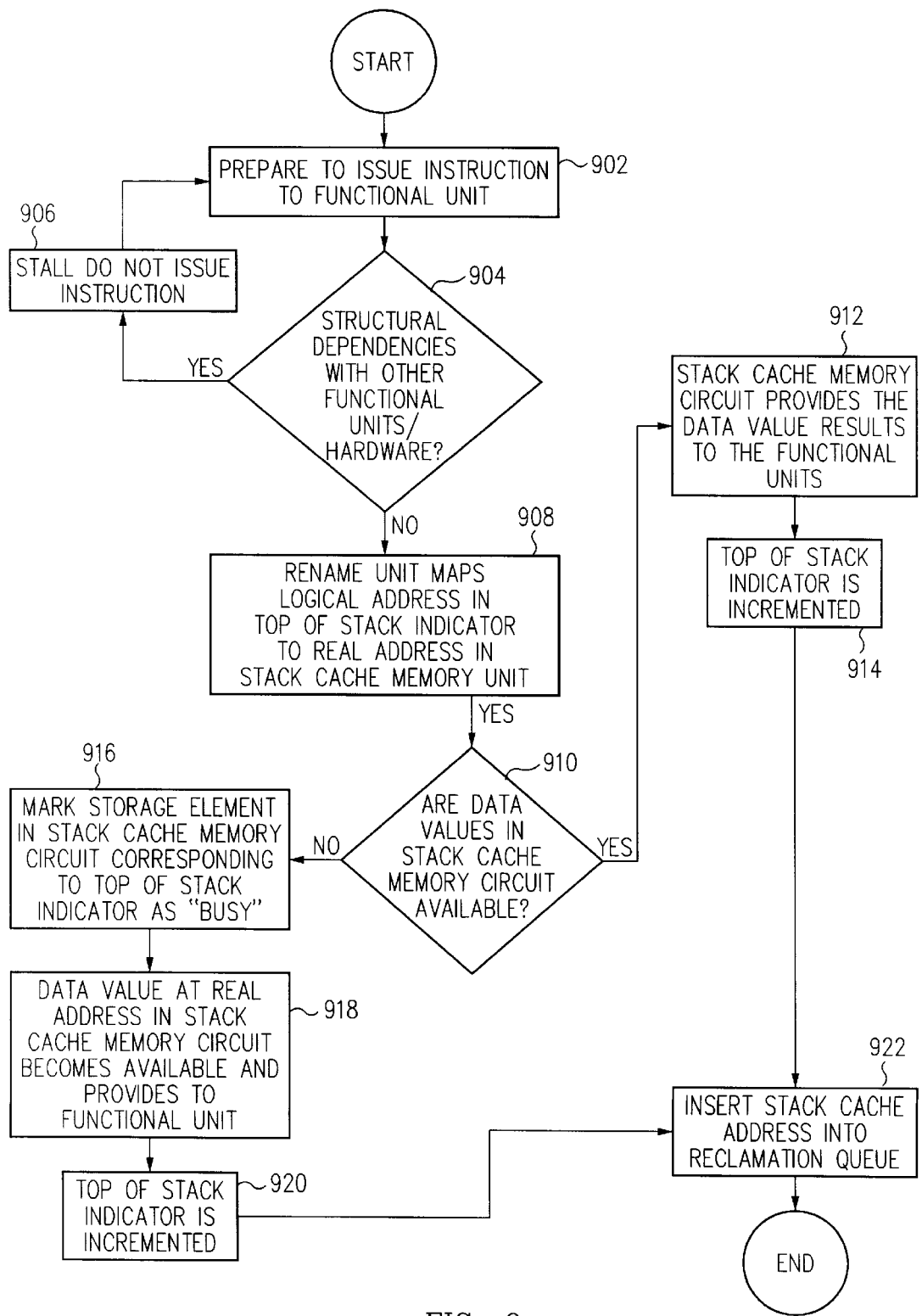
FIG. 9 is flowchart illustrating the overall steps used by one embodiment of the present invention to facilitate popping data off of a stack.

Referring now to FIG. 9, a flowchart illustrates the overall steps used by one embodiment of the present invention to facilitate popping data off of stack 400 (FIG. 4A). A store instruction can cause a stack processor to pop data off a stack in a stack processor. Initially, an instruction is issued to a functional unit on the processor 100 (FIG. 1) at step 902 in FIG. 9. The functional unit issued the instruction can require at least one or two operands to generate a result. For example, a floating point multiply instruction issued to floating point unit 143 in FIG. 1 requires a multiplicand and a multiplier to perform a floating point multiplication operation.

Next, in FIG. 9 processing transfers from step 902 to determination step 904 where a dependency check determines if there are any structural dependencies associated with stack 400 (FIG. 4A) as indicated by top of stack indicator 702 (FIG. 7). If a structural dependency is found, the functional unit can not continue processing the instruction and control passes to step 906 (FIG. 9). Additional instructions are typically not issued until the structural dependencies are resolved. For example, a structural dependency can occur when a functional unit is already busy executing another instruction.

When structural dependencies are resolved in step 904 in FIG. 9, processing transfers to step 908. At step 908, rename unit 704 (FIG. 7) maps a logical stack address corresponding to the value in top of stack indicator 702 to a real stack cache memory address. This real stack cache memory address is provided over stack rename logic output port 617 (FIG. 6) to stack cache memory circuit 606.

Determination step 910 in FIG. 9 checks if the one or more data values in stack cache memory circuit 606 (FIG. 6) are available. If the data values are available processing transfers to step 912 in FIG. 9 where stack cache memory circuit 606 (FIG. 6) or annex 604 provides the data value results to the functional unit over one or more stack data output ports 630 (FIG. 6).

Next, at step 914 the real stack cache memory address from stack cache memory circuit 606 is reclaimed. In a preferred embodiment, top of stack indicator is advanced at step 914. Accordingly, the real stack cache memory address is removed from stack cache rename unit 704 (FIG. 7). Processing continues at step 922 wherein the stack cache address is inserted into the reclamation queue for later use.

As an alternative, processing transfers from step 910 to step 916 in FIG. 9 if the data values are not available or have not been generated. At step 916, the storage elements in stack cache memory circuit 606 (FIG. 6) are marked as busy. This prevents them from being written to by another functional unit before the data values are available. When data values are available, they are provided to functional units at step 918. Processing continues at step 920 in FIG. 9 where the real stack cache address in rename unit 704 corresponding to top of stack indicator 702 is established as the new top of stack in stack cache memory circuit 606 (FIG. 6). This novel aspect of the present invention maps around the previous top of stack and allows other functional units to access the stack in a substantially simultaneous manner. Accordingly, between step 916 and step 922 in FIG. 9 other functional units can continue to process instructions which access stack 400 (FIG. 4A). Processing continues at step 922 wherein the stack cache address is inserted into the reclamation queue for later use.

As the data values in stack cache memory circuit 606 (FIG. 6) become available, functional units waiting from the results are notified. New values are typically available when a functional unit has completed several cycles and has generated results. These results are then forwarded to the functional unit from stack annex 604 (FIG. 6) or directly from the functional unit generating the results. Unlike the prior art, a functional unit does not use a top of stack to obtain values from the stack 400 (FIG. 4A). Instead, the functional unit uses the real stack cache address provided in step 918 in FIG. 9 to obtain data values from stack cache memory circuit 606 (FIG. 6) directly. In one embodiment, a functional unit provides a real stack cache memory address over real stack input port 615 and obtains data values over stack data output ports 630.

Figure 10:
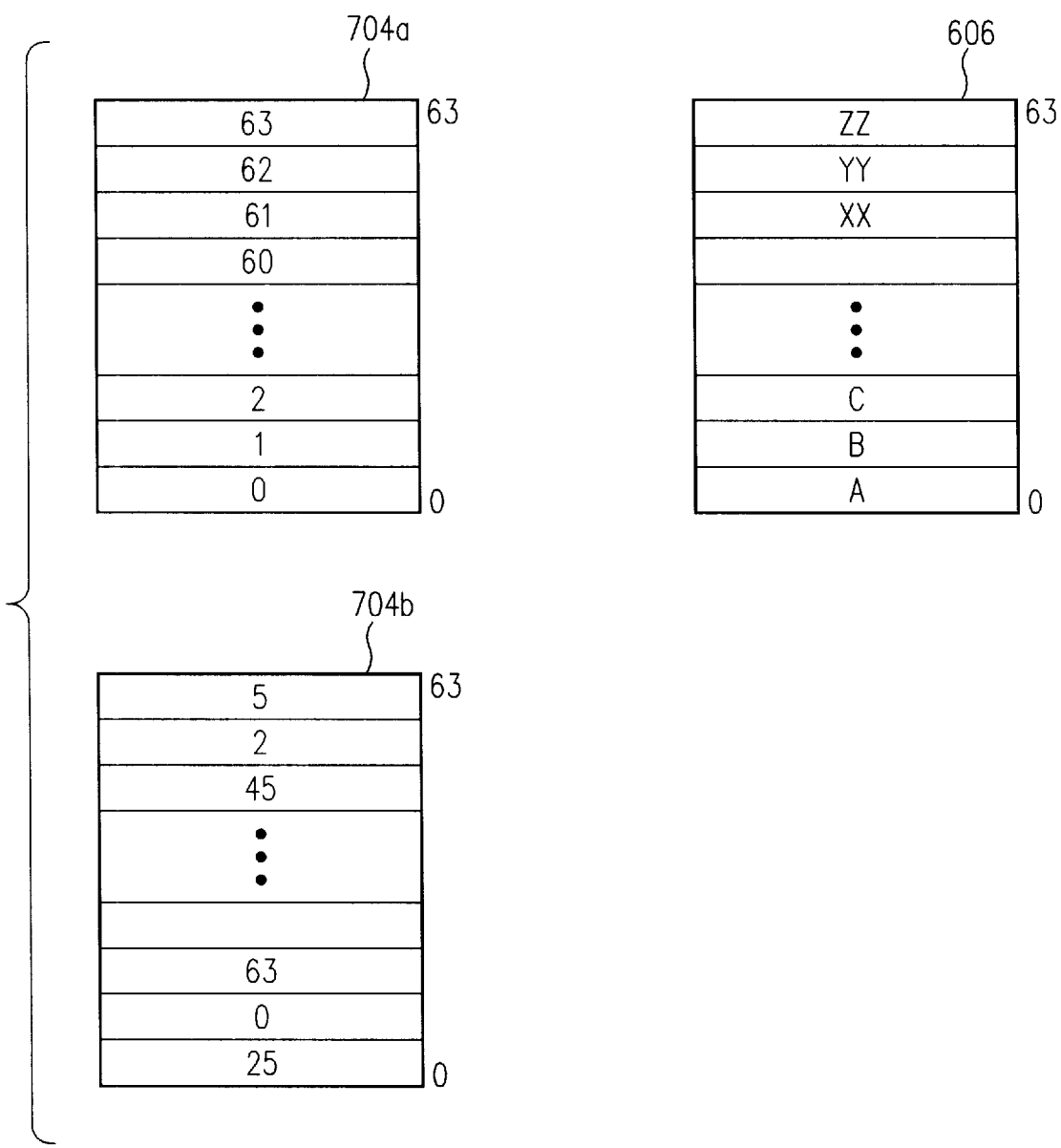
FIG. 10 is a conceptual block diagram illustrating a rename unit initially, a rename unit at a later time, and a corresponding stack cache memory circuit of the present invention.

FIG. 10 is a conceptual block diagram illustrating a rename unit 704a initially, a rename unit 704b at a later time, and a corresponding stack cache memory circuit 606 of the present invention. In this example, the sample values stored in stack cache memory circuit 606 are used for calculations in hardware processor 100 (FIG. 1). In contrast, the values contained in rename unit 704a (FIG. 10) correspond to the addresses of storage elements in stack cache memory circuit 606. An entry in rename unit 704a indicates that the storage element is available in stack cache storage circuit 606 in FIG. 10. According to rename unit 704a, storage elements in stack cache memory circuit 606 will be accessed sequential because the stack cache address values are in sequence 0 through 63. The initial order of storing elements in stack cache circuit 606 coincides with the address locations in rename unit 704a. In operation, however, the sequence of available storage elements in stack cache memory circuit 606 can be rearranged. Rename unit 704b illustrates one arrangement of stack cache addresses in stack cache memory circuit 606. The storage elements in stack cache memory circuit 606 are addressed as a stack using sequence of address entries in rename unit 704b. For example, the top-of-stack according to rename unit 704b is address 5 in stack cache memory circuit 606. Further, a subsequent entry to the top-of-stack according to rename unit 704 would be address 2 in stack cache memory circuit 606. The added level of indirection illustrated in rename unit 704a and rename unit 704b allows stack cache memory circuit 606 to be accessed as a stack even though the actual storage elements in stack cache memory circuit 606 (FIG. 6) are accessed out of order. Top of stack indicator 702 in FIG. 7 accesses each element of rename unit 704b (FIG. 10) sequentially and in a circular manner to maintain consistency for each stack access.

While specific embodiments have been described herein for purposes of illustration, various modifications may be made without departing from the spirit and scope of the invention. Those skilled in the art understand that the present invention can be implemented using a variety of different stack processors modified in accordance with principles of the present invention.

Accordingly, the invention is not limited to the above described embodiments, but instead is defined by the appended claims in light of their full scope of equivalents.

What is claimed is:

1. A stack apparatus capable of providing access to a stack wherein at least one stack element on the stack is accessible substantially simultaneously by one or more functional units in a stack processor, each of the one or more functional unit in the stack processor being operatively coupled to the stack apparatus, the stack apparatus comprising:

a stack renaming unit capable of renaming a logical stack address generated by a top of stack indicator to a real stack address;

a stack control unit coupled to the stack renaming unit, wherein said stack control unit provides one or more control signals to the stack renaming unit, and coordinates the operation of the stack renaming unit within the stack apparatus;

a stack cache memory circuit coupled to the stack renaming unit, wherein said stack cache memory circuit receives the real stack address and said stack cache memory circuit generates a data value to be used in a functional unit; and a real stack address output port coupled to the stack renaming unit, wherein said real stack address output port provides the real stack address to the functional unit, said real stack address is used to store results generate by the functional unit directly into the stack cache memory circuit.

2. The stack apparatus of claim 1 wherein the stack renaming unit further comprises, a stack rename logic capable of mapping a series of logical stack addresses to a series of real stack address which can be out of order.

3. The stack rename logic of claim 2 further comprising, a rename unit having a plurality of storage elements capable of storing a plurality of the real stack addresses used in a stack cache memory circuit, wherein said plurality of the real stack addresses corresponds to a plurality of the logical stack addresses;

a circular counter element operatively coupled to the rename unit, wherein said circular counter element generates a value wherein said value sequences circularly through each of the logical stack addresses to access each of the plurality of real stack addresses stored in the rename unit; and a reclamation queue coupled to the rename unit, wherein said reclamation queue provides an unused real stack address to the stack cache memory circuit, wherein said unused real stack address is no longer being used by the one or more functional units.

4. The stack rename logic of claim 2 further comprising, a stack annex operatively coupled to the stack cache memory circuit and operatively coupled to the rename unit, wherein said stack annex operates as a temporary pipeline register capable of holding one or more data values generated by the one or more functional units.

5. The stack apparatus of claim 4 further comprising, a MUX unit operatively coupled to the stack cache memory circuit and the stack annex, wherein said MUX unit selects an output data value from the stack cache memory circuit or the stack annex depending on which of the data values is valid.

6. The stack rename logic of claim 2 further comprising, a real stack address input port.

7. A method for pushing a data value onto a stack storage element of a stack memory circuit which enables the stack memory circuit to provide substantially simultaneous access to more than one stack storage element on the stack memory circuit by one or more functional units in a stack processor, the method comprising:

renaming a first logical stack address generated by a top of stack indicator to a first real stack address;

receiving the first real stack address in a first functional unit;

advancing the top of stack indicator to a second logical stack address before the first functional unit has generated results;

using the first real stack address to store the results generated by the first functional unit directly into the corresponding stack storage element in the stack memory circuit wherein said corresponding stack storage element is a storage element other than a top of stack storage element; and, renaming the second logical address generated by the top of stack indicator to a second real stack address.

8. The method of claim 7 further comprising receiving the second real stack address in a second functional unit.

9. The method of claim 8 further comprising using the second real stack address to store the results generated by the second functional unit directly into the corresponding stack storage element in the stack memory circuit.

10. A method for popping a data value from a stack storage element of a stack memory circuit which enables the stack memory circuit to provide substantially simultaneous access to more than one stack storage element on the stack memory circuit by one or more functional units in a stack processor, the method comprising:

renaming a first logical stack address generated by a top of stack indicator to a first real stack address;

determining if a first data value associated with the first real stack address is available and stored in the first real stack address in the stack memory circuit;

when the first data value is available, notifying the one or more functional units that the first data value is available for immediate use;

when the first data value is not available, marking the first real stack address in the stack memory circuit as busy;

advancing the top of stack indicator to a second logical address before the first data value is available; and repeating the above steps each time a data value is popped from the stack storage element of a stack memory circuit.

11. The method of claim 10 wherein marking the first real stack address further includes:

retiring the first real stack address by moving the first real stack address into a reclamation queue for later use as a real stack address.

\* \* \* \* \*